(12) United States Patent
Nylander et al.

(10) Patent No.: US 10,078,156 B2
(45) Date of Patent: Sep. 18, 2018

(54) PRECIPITATION SENSOR

(71) Applicant: TECONER OY, Helsinki (FI)

(72) Inventors: Pauli Nylander, Helsinki (FI); Taisto Haavasoja, Helsinki (FI)

(73) Assignee: TECONER OY, Helsinki (FI)

( * ) Notice: Subject to any disclaimer, the term of this patent is extended or adjusted under 35 U.S.C. 154(b) by 156 days.

(21) Appl. No.: 15/036,873

(22) PCT Filed: Nov. 14, 2014

(86) PCT No.: PCT/FI2014/050860
§ 371 (c)(1),
(2) Date: May 16, 2016

(87) PCT Pub. No.: WO2015/071545
PCT Pub. Date: May 21, 2015

(65) Prior Publication Data
US 2016/0327687 A1   Nov. 10, 2016

(30) Foreign Application Priority Data
Nov. 18, 2013 (FI) ..................................... 20136139

(51) Int. Cl.
*G06F 19/00* (2018.01)
*G01W 1/14* (2006.01)
(52) U.S. Cl.
CPC ..................................... *G01W 1/14* (2013.01)
(58) Field of Classification Search
CPC ......... G01W 1/14; E01F 9/559; G01B 17/025
(Continued)

(56) References Cited

U.S. PATENT DOCUMENTS

| 4,613,938 A | 9/1986 | Hansen et al. |
| 5,528,224 A | 6/1996 | Wang |
| 2003/0051535 A1* | 3/2003 | Coupland ............ G01N 29/022 |
| | | 73/64.53 |

FOREIGN PATENT DOCUMENTS

| DE | 44 39 048 A1 | 5/1996 |
| EP | 3 360 892 A | 4/1990 |

(Continued)

OTHER PUBLICATIONS

International Search Report, dated Feb. 20, 2015, from corresponding PCT Application.
(Continued)

*Primary Examiner* — Edward Raymond
(74) *Attorney, Agent, or Firm* — Young & Thompson

(57) ABSTRACT

A technique for characterizing precipitation includes receiving an impedance signal that is indicative of the impedance in a predetermined area on a measurement surface, deriving, on basis of the impedance signal, a first precipitation rate that is descriptive of accumulated mass of precipitation particles falling on the predetermined area during a calculation period, receiving an acoustic signal that is indicative of acoustic impacts caused by the precipitation particles in vicinity of the measurement surface, deriving, on basis of the acoustic signal, a second precipitation rate that is descriptive of accumulated mass of the precipitation particles during the calculation period, and designating, in response to receiving an indication regarding a presence of precipitation, current precipitation type as one of predetermined precipitation types at least in part on basis of a first precipitation indicator value derived on basis of the first and second precipitation rates.

9 Claims, 12 Drawing Sheets

(58) Field of Classification Search
USPC .................. 702/3, 13, 14, 182–185, 188
See application file for complete search history.

(56) References Cited

FOREIGN PATENT DOCUMENTS

| EP | 0 422 553 A1 | 4/1991 |
|----|--------------|--------|
| GB | 2 412 735 A | 10/2005 |
| JP | H6-82569 A | 3/1994 |
| JP | H6-88883 A | 3/1994 |
| JP | H7-20074 A | 1/1995 |
| JP | H9-101377 A | 4/1997 |

OTHER PUBLICATIONS

Finnish Search Report, dated Jun. 6, 2014, from corresponding Finnish Application.

Department of Commerce. "Specification for an enhanced precipitation identification (EPI) sensor for the automated surface observing system (ASOS)," NOAA, National Weather Service, Specification No. NWS-S100-2MT2-1-SP1001, Mar. 2010.

"FAAXX013: Aviation Surface Weather Observation Network (ASWON), update dated Jun. 27, 2011," IT Dashboard FY2014 Edition, 2013. Retrieved 2013, from https://www.itdashboard.gov/investment/evaluation-history/338.

Biral. "HSS VPF-750 sensor," Ref: VPF-750.1011, 2011.

Telecontrolli S.p.A. "Rain Sensor," 2003. Retrieved from http://www.tei-masina.com/tc/docs/Rain_sensor.pdf.

Ase. "DS-8 Rain/Snow Sensor Controller Installation Manual," 2011. Retrieved from http://www.goase.com/ds8.htm.

Vaisala. "Vaisala RAINCAP® Sensor Technology," 2008. Retrieved from http://www.vaisala.com/Vaisala%20Documents/Technology%20Descriptions/RAINCAP_Technology.pdf.

Vaisala. "Vaisala Present Weather Detector PWD52," 2010. Retrieved from http://www.vaisala.com/Vaisala%20Documents/Brochures%20and%20Datasheets/PWD52-Datasheet-B211065EN-A-lores.pdf.

* cited by examiner

PRECIPITATION SENSOR

TECHNICAL FIELD

The example and non-limiting embodiments of the present invention relate to a method, an apparatus and a computer program for characterizing precipitation.

BACKGROUND

Precipitation and its properties are the most common parameters in addition to temperature in many weather-related applications. The precipitation parameters of interest may include the precipitation state (e.g. whether it is precipitating or not), the precipitation type, the intensity of precipitation and/or the accumulated precipitation. Because precipitation events are in practice almost always very unevenly distributed in time and location, a single observation represents a short period time in a small geographical area. Consequently, for weather-related applications that require reliable and up-to-date information regarding characteristics of precipitation, instant and local observations are the most useful ones.

Precipitation can be determined as precipitation particles of at least predetermined size and/or at least predetermined intensity falling on an area of interest under observation. Since precipitation may have a significant impact on operation in several walks of life and areas of business, it is highly desirable to be able to use a sensor, a plurality of sensors or a network of sensors to automatically/autonomously detect the current weather conditions with respect to precipitation parameters of interest.

However, such automatic determination of the type of the precipitating particles has proved very difficult. As example, the National Weather Service (NWS) sensor specification defines a professional grade sensor in a document entitled "Specification for an enhanced precipitation identification (EPI) sensor for the automated surface observing system (ASOS)", specification No.: NWSS100-2MT-2-1-SP1001, March 2010, downloadable as "Specification_for_EPI_Sensor_April_r4_0.pdf" for example at https://www.fbo.gov/index?s=opportunity&mode=form&id=08177248d35976db4a5c226b3b7d44ee&tab=core&_cview=0 on the priority date of the present patent application). However, none of the sensors proposed within this framework was able to meet these requirements, and acquisition program was suspended, see for example the update dated 2011 Jun. 27 at https://www.itdashboard.gov/investment/evaluation-history/338 (as available on the priority date of the present patent application).

One way to characterize the type and intensity of precipitation particles is to apply a set of predetermined weather codes. An example in this regard is provided in the World Meteorological Organization code table 4680, which includes weather codes that are often used to report the precipitation detection, state of the precipitating particles and intensity of the phenomenon. This code table is an implementation of a similar table (4677) for human observers. The observer reports the phenomenon that best describes the weather at observation time that typically actually is a 10-20 minutes period before the report sending time.

Hence, the precipitation may be characterized e.g. whether it is precipitating or not (the precipitation state) and possibly further whether the precipitation is liquid precipitation (e.g. rain, drizzle) or solid precipitation (e.g. snow, hail stones). In some scenarios it might be desirable to alternative or additionally, distinguish possible mixed precipitation type (e.g. rain and snow) or freezing precipitation (e.g. freezing rain or freezing drizzle). Further characteristics may include characterization of the precipitation intensity and accumulated precipitation.

An example of a known technique for precipitation characterization is an impedance-based detector for detecting the precipitation state, i.e. the presence or absence of precipitation. Such precipitation detectors may be referred to as ON/OFF sensors/detectors, and they typically rely on measuring the electrical impedance changes between a pair of measurement electrodes. Controlled heating may be applied to keep the measurement surface warm in order to melt snow and also to enable an improved detection of cessation of the precipitation event. A typical precipitation detector detects precipitation and controls a relay accordingly. An example of such a precipitation sensor is described e.g. in the document entitled "Rain Sensor" by Telecontrolli S.p.A., available on the priority date of the present patent application at http://www.teimasina.com/tc/docs/Rain_sensor.pdf. An enhanced sensor may have a built-in thermometer enabling more options for the relay control logic. An example of such an enhanced sensor is described in the document entitled "The DS-8 Rain/Snow Sensor Controller" by Automated Systems Engineering (ASE), Colorado Springs, Colo., available on the priority date of the present patent application at http://www.goase.com/ds8.htm.

Another example of known technique for precipitation characterization is an acoustic precipitation sensor that is mainly applicable for measuring properties of rain. On the other hand, such an acoustic sensor is typically less useful for detecting e.g. snow or drizzle that result in acoustic signals that may be weak and obscure. Consequently, such acoustic sensor is unreliable in detecting presence of snow or drizzle, or even presence of low intensity rain. Moreover, an ambient noise component typically present in the acoustic sensor signal is likely to disturb the sensor operation as well. On the other hand, an acoustic sensor may be able to measure rain accumulation quite accurately, due to the fact that the lowest rain intensities have a minor impact on the accumulated rain amount. As an example of acoustic sensor, Vaisala RAINCAP® sensor together with Vaisala Weather Transmitter WXT520 contains an acoustic rain detector. This exemplifying acoustic sensor is described e.g. in the document entitled "Vaisala RAINCAP® Sensor Technology", available on the priority date of the present application at httpJ/www.vaisala.com/Vaisala %20Documents/Technology %20Descriptions/R AINCAP_Technology.pdf.

A further example of a known technique is an optical precipitation sensor. Optical precipitation sensors measure scattering and/or attenuation of light from the precipitation particles in a sample volume. Particle sizes and falling speed are estimated from the data, which is subsequently used in determining the precipitation type. Slow falling particles are characterized as snow. These type of sensors are able to detect precipitation and measure the rain intensity relatively well, while they typically have difficulties to estimate accumulated precipitation for other types of precipitation (typically expressed as water content), because the precipitation type determination is not accurate and/or reliable. Additionally, other flying particles of similar size as typical precipitation particles, such as flower seed and insects, easily cause false rain reports. U.S. Pat. No. 4,613,938 describes an example of such a method, and e.g. Biral HSS VPF 750 sensor uses such a technique (more detailed information regarding this sensor is available on the priority date of the present patent application e.g. at http://www.biral.com/meteorological-sensors/visibility-and-presentweather/hss-vpf-750-visibility-present-and-past-weather-sensor).

An optical sensor with a capacitive rain detector may be applied to eliminate false detections caused by dry (non-precipitation) particles. As an example, Vaisala Present Weather Detector PWD52 uses this technique and is able to report a full set of precipitation parameters (more information regarding this sensor is available on the priority date of the present patent application e.g. at http://www.vaisala.com/Vaisala %20Documents/Brochures %20and%20Datash eets/PWD52-Datasheet-B211065EN-A-lores.pdf).

Further in known techniques, the precipitation type may be characterized by employing a combination of optical forward scatter measurement and a capacitive detector. The optical system measures primarily the size (volume) of the precipitating particles and the capacitive measurement estimates the corresponding water content (weight). Typically the volume/weight ratio for snow is in the order of ten times bigger than that of rain. This technique, however, has problems, when the intensity of precipitation varies a lot and/or fast or when the intensity is relatively low, because the capacitive measurement is typically provides slower response to changes in precipitation intensity than the optical measurement. This may lead to false reports of precipitation type and/or intensity. Moreover, known sensors implementing this technique are relatively bulky and also expensive. Such sensors typically also require heating the whole sensor structure in order to keep it operational in changing conditions, possibly leading to excessive power consumption.

Precipitation accumulation (amount) is often measured using a tipping bucket sensor, where one tip corresponds to 0.2 mm of accumulated rainfall. When this type of precipitation accumulation sensor is clean and well calibrated, it is accurate, does not consume a significant amount of operating power and is cheap to manufacture. The best precipitation accumulation sensors typically employ a weighing principle, i.e. determining the weight of the accumulated precipitation, to measure the accumulated amount of water/snowfall. This kind of measurement technique may make it difficult to keep the sensor accurate and operational in all weather conditions. Hence the precipitation accumulation sensors can be used to reliably measure also intensity of moderate and heavy precipitation events, especially rain events.

Yet further in known techniques, data captured by a weather radar is often used to visualize precipitation location and intensity. However, because of its physical limitations a weather radar is not able to measure precipitation from very low clouds. If the precipitating cloud is far away from the radar, the data may give wrong impression of the actual intensity and/or location of the precipitation hitting the ground. As a few examples of shortcomings of a weather radar based precipitation characterization, the precipitation may have evaporated before reaching the ground or light precipitation particles such as snow may drift up to 100 km before hitting the ground. Similar limitations apply also to the determination of the precipitation type from the radar signals. Consequently, a relatively dense network of precipitation type and intensity sensors is typically required to enhance the radar signal processing, especially with respect to processing the noise thresholds of the radar signals near ground.

In summary regarding known techniques, most known precipitation sensors have acceptable performance only in rain, while even reliable detection of snow events has proved difficult. While impedance-based sensors can have a reasonable accuracy of intensity measurement regardless of the precipitation type and intensity, for other types of indirect precipitation sensors reliable characterization of the precipitation type is necessary to determine the liquid water equivalent precipitation intensity.

SUMMARY

In order to address the shortcomings of known the techniques, the present invention proposes a technique for characterizing precipitation at least with respect to precipitation type. The characterization is based on a novel approach for combining information obtained from an impedance sensor and from an acoustic sensor to characterize the precipitation type, and possibly also the precipitation intensity. Moreover, the characterization of the precipitation type and/or intensity may be further based on information regarding the dew point temperature and/or wet bulb temperature.

According to an example embodiment, an apparatus for characterizing precipitation is provided, the apparatus comprising a precipitation analyzer configured to receive an impedance signal that is indicative of the impedance in a predetermined area on a measurement surface, to derive, on basis of the impedance signal, a first precipitation rate that is descriptive of accumulated mass of precipitation particles falling on said predetermined area during a calculation period, to receive an acoustic signal that is indicative of acoustic impacts caused by said precipitation particles in vicinity of said measurement surface, to derive, on basis of said acoustic signal, a second precipitation rate that is descriptive of accumulated mass of said precipitation particles during the calculation period, and to designate, in response to receiving an indication regarding a presence of precipitation, current precipitation type as one of predetermined precipitation types at least in part on basis of a first precipitation indicator value derived on basis of the first and second precipitation rates.

According to another example embodiment, another apparatus for characterizing precipitation is provided, the another apparatus comprising at least one processor and at least one memory including computer program code for one or more programs, the at least one memory and the computer program code configured to, with the at least one processor, cause the apparatus at least to receive an impedance signal that is indicative of the impedance in a predetermined area on a measurement surface, to derive, on basis of the impedance signal, a first precipitation rate that is descriptive of accumulated mass of precipitation particles falling on said predetermined area during a calculation period, to receive an acoustic signal that is indicative of acoustic impacts caused by said precipitation particles in vicinity of said measurement surface, to derive, on basis of said acoustic signal, a second precipitation rate that is descriptive of accumulated mass of said precipitation particles during the calculation period, and to designate, in response to receiving an indication regarding a presence of precipitation, current precipitation type as one of predetermined precipitation types at least in part on basis of a first precipitation indicator value derived on basis of the first and second precipitation rates.

According to another example embodiment, a method for characterizing precipitation is provided, the method comprising receiving an impedance signal that is indicative of the impedance in a predetermined area on a measurement surface, deriving, on basis of the impedance signal, a first precipitation rate that is descriptive of accumulated mass of precipitation particles falling on said predetermined area during a calculation period, receiving an acoustic signal that is indicative of acoustic impacts caused by said precipitation particles in vicinity of said measurement surface, deriving, on basis of said acoustic signal, a second precipitation rate that is descriptive of accumulated mass of said precipitation particles during the calculation period, and designating, in response to receiving an indication regarding a presence of precipitation, current precipitation type as one of predetermined precipitation types at least in part on basis of a first precipitation indicator value derived on basis of the first and second precipitation rates.

According to another example embodiment, a computer program for characterizing precipitation is provided, the computer program including one or more sequences of one or more instructions which, when executed by one or more processors, cause an apparatus at least to perform the operations described hereinbefore for the method.

The computer program referred to above may be embodied on a volatile or a non-volatile computer-readable record medium, for example as a computer program product comprising at least one computer readable non-transitory medium having program code stored thereon, the program which when executed by an apparatus cause the apparatus at least to perform the operations described hereinbefore for the computer program.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings.

DESCRIPTION OF SOME EMBODIMENTS

Figure 1:
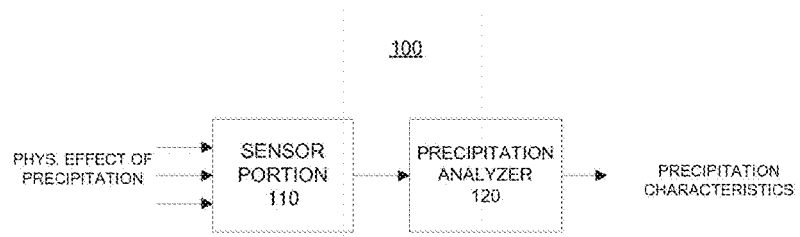
FIG. 1 schematically illustrates some components of an exemplifying arrangement for characterizing precipitation.

FIG. 1 schematically illustrates some components of an arrangement 100 for characterizing precipitation. The arrangement 100 comprises a sensor portion 110 and a precipitation analyzer portion 120. In the following, the precipitation analyzer portion 120 is referred, in short, to precipitation analyzer 120.

Although depicted as a single entity, the sensor portion 110 may be provided as a plurality (i.e. two or more) separate sensor (sub-)portions, each hosting one or more sensors. However, for brevity and clarity of description and without losing generality with respect to distribution of sensors into separate or dedicated sensor (sub-)portions, the following description refers to the sensor portion 110 as an entity hosting the sensors applied in embodiments of the present invention. The sensor(s) of the sensor portion 110 are arranged to provide respective sensor signal(s), derived on basis of physical characteristics measured by the respective sensor, whereas the precipitation analyzer 120 is arranged to receive the sensor signal(s), possibly accompanied by further sensor-related information, from the sensor portion 110. The precipitation analyzer 120 is arranged to provide indication(s) of detected or estimated precipitation characteristics.

The arrangement 100 may be provided e.g. as a precipitation sensor apparatus comprising the sensor portion 110 and the precipitation analyzer 120. As another example, the arrangement 100 may be provided as precipitation analyzer apparatus 120 that can be coupled or connected to the sensor portion 110 that is arranged to provide one or more sensor signals of respective type for analysis in the precipitation analyzer 120. Regardless of providing the arrangement 100 in a single apparatus or distributed to two or more separate apparatuses, the precipitation analyzer 120 may be provided by hardware means, by software means or by combination of hardware means and software means.

Figure 2:
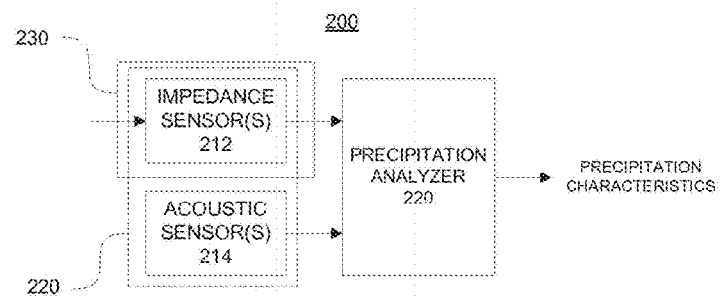
FIG. 2 schematically illustrates some components of an exemplifying precipitation sensor.

FIG. 2 schematically illustrates some components of a precipitation sensor 200 for characterizing precipitation within the framework of the arrangement 100. The precipitation sensor 200 comprises a sensor portion 210 and the precipitation analyzer 220. The sensor portion 210 comprises one or more impedance sensors 212 and one or more acoustic sensors 214. Moreover, the above considerations with respect to providing the arrangement 100 e.g. as a single apparatus comprising the sensor portion 110 and the precipitation analyzer 120 equally apply to the sensor portion 210 and the precipitation analyzer 220 of the arrangement 200 as well. The precipitation analyzer 220, and hence the precipitation sensor 200, may is arranged to extract precipitation characteristics of interest on basis of the impedance signal provided by the impedance sensor 212 and on basis of the acoustic signal provided by the acoustic sensor 214. The precipitation characteristics may comprise e.g. the current precipitation type, as will be described in detail in the following.

The one or more impedance sensors 212 are provided on a measurement surface 230. The measurement surface 230 is arranged in the precipitation sensor 200 such that the precipitation can freely fall onto the measurement surface 230 when the precipitation sensor 200 is in use. The measurement surface 230 is preferably further arranged in the precipitation sensor 200 such that it may be set to a position that, when the precipitation sensor 200 is in use, facilitates the precipitation particles (especially ones in liquid form) falling out from the measurement surface after having been detected. As an example, the measurement surface 230 may comprise a conical surface or a planar surface.

The precipitation sensor 200 may further comprise additional components, such as a heater for heating the measurement surface 230 and further sensors for measuring e.g. one or more of the following: a sensor for measuring air humidity, a sensor for measuring air temperature and a sensor for measuring dew point temperature. Moreover, an optical sensor or a radar type sensor may be included for introducing an additional dimension input for the precipitation analyzer 220. Examples of such additional components are provided later in this text.

The one or more impedance sensors 212 are arranged in predetermined areas or positions on the measurement surface 230. An impedance sensor 212 is arranged to provide a respective impedance signal that is indicative of the impedance in the respective area or position on the measurement surface 230. The impedance signal may directly indicate the respective impedance or the impedance signal may provide information or data that enables determination (e.g. computation) of the respective impedance.

Indication of electronic impedance of an area (or position) of interest is a useful way to detect presence of water in the area (or position), due to the fact that water molecules have very special relative permittivity (dielectric constant 80) and polarizing properties. For an impedance sensor applied as part of the precipitation sensor 300, a change in the indicated impedance can be interpreted as an indication of precipitation falling on the measurement surface 230.

An impedance sensor 212 may be provided e.g. as an impedance sensor relying on capacitive measurement (applying insulated electrodes) or as an impedance sensor relying on conductive measurement. As an example, if employing an impedance sensor relying on conductive measurement (e.g. an impedance sensor in conductive mode), both the measurement current and the induced polarizing voltage in the measurement electrodes of impedance sensor are measured and provided as an impedance signal from the impedance sensor 212 to enable water amount estimation. As another example, if employing an impedance sensor relying on capacitive measurement (e.g. an impedance sensor in capacitive mode), the measurement electrodes of the impedance sensor 212 form a capacitor that is part of an oscillator circuit. When the measurement surface 230 is dry, the capacitance of the impedance sensor 212 is at its lowest and hence the frequency of the oscillator circuit is at its highest and stable. If the amount of water on the measurement surface 230 increases, also the capacitance increases and, consequently, the frequency of the oscillator circuit decreases. The mapping between the capacitance and the amount of water is not linear: when there is a lot of water on the measurement surface 230, a small change in capacitance corresponds to a higher amount of water than a similar change in capacitance for a drier surface. This changing dynamics of the impedance signal is compensated in conversion from the impedance signal to a corresponding precipitation signal.

The measurement surface 230 on which the impedance sensor(s) 212 is/are provided may be heated for improved detection of water thereon. In this regard, the precipitation sensor 200 may comprise a heater for heating the measurement surface 230. The heater may be arranged to heat the measurement surface 230 to a predetermined temperature. Alternatively, the heater may be arranged to operate in dependence of the estimated amount of water on the measurement surface 230, e.g. such that the surface heating power can be measured and that the heating power is adjustable up to a predefined limit to keep the measurement surface 230 dry. The heater may be operated e.g. such that increasing amount of water results in increasing the heating power and vice versa. As an example, the amount of water may be estimated on basis of the (electrical) resistance and/or capacitance of the measurement surface 230: decreasing resistance and/or increasing capacitance implies increasing amount of water. A further performance improvement may be provided by applying a plurality of impedance sensors at different areas/positions on the measurement surface 230, thereby providing a higher number of detection/measurement points for subsequent characterization of precipitation. The impedance sensor(s) 212 may be provided with a hydrophobic coating to avoid water from the precipitation particles staying on the impedance sensor(s) 212 for a prolonged period of time. When at least one of the impedance sensors 214 has a hydrophobic coating, the sensors dynamics is improved because there is less water, in average, on the measurement surface 230.

A precipitation particle hitting the acoustic sensor 214 or hitting a surface in vicinity of the acoustic sensor 214 causes a mechanical impulse, location and energy of which can be measured with a sufficient accuracy. Herein, indication of precipitation particles of such type is referred to as an acoustic measurement and/or acoustic signal because one of the most useful techniques in this regard relies on acoustic or vibration measurements. However, the term acoustic measurement or acoustic signal should be construed broadly, encompassing measurements or signals descriptive of impacts or impulses caused by the precipitation particles.

The acoustic sensor 214 may be provided as a microphone, in particular as a miniature microphone. As another example, the acoustic sensor 214 may be provided as a piezo electric transducer that may even be applied as the body of the sensing surface, thereby resulting in an advantageous structure for the acoustic sensor 214. Moreover, a piezo electric sensor signal may better correspond to precipitation particle sizes in comparison to a (miniature) microphone.

While precipitation particles such as rain drops and hail stones typically result in prominent peaks in the respective acoustic signal, which peaks relatively clearly indicate the timing, (temporal) intervals and relative sizes of the precipitation particles, smaller and/or lighter precipitation particles may provide very little acoustic signal for subsequent analysis. This is typically the case when the precipitation is e.g. snow or drizzle. On the other hand, during drizzle there is a large number of small precipitation particles in comparison to a light snow or snow grain event, which is information that may be made use of in telling these precipitation types apart.

In the precipitation sensor 200 the exact positioning of the acoustic sensor(s) 214 with respect to position(s) of the impedance sensor(s) 212 is not important, but it is sufficient to have the acoustic sensor(s) 214 arranged to capture respective acoustic signal(s) caused by the precipitation particles in vicinity of the measurement surface 230. As an example, the captured acoustic signal(s) may be indicative of the acoustic impacts caused by the precipitation particles falling on the measurement surface 230, on another surface of the precipitation sensor 200 or a surface in vicinity of the precipitation sensor 200.

The precipitation analyzer 220 is arranged to receive the impedance signal(s) from the impedance sensor(s) 212 and the acoustic signal(s) from the acoustic sensor(s) 214. Instead of the acoustic signal as such, an acoustic sensor 214 may, alternatively or additionally, provide further information derived on basis of the respective acoustic signal, e.g. a corresponding precipitation signal and/or precipitation rate (which are described in detail hereinafter). For clarity and brevity of description, in the following characterization of precipitation based on a single impedance signal and a single acoustic signal is described. However, this generalizes into processing of a plurality of impedance and/or acoustic signals.

The precipitation analyzer 220 is arranged to derive, on basis of the impedance signal, a precipitation rate that is descriptive of an accumulated amount of precipitation, e.g. an accumulated mass of the precipitation particles falling on the area of the measurement surface 230 occupied by the impedance sensor 212 during a calculation period. This precipitation rate derived on basis of the impedance signal may be referred to, for clarity and brevity of description, as a first precipitation rate $R_1$.

In this regard, the precipitation analyzer 220 may be arranged to convert the impedance signal into a respective precipitation profile. The precipitation profile is descriptive of the distribution of relative amplitudes of the precipitation particles falling on the area of the measurement surface 230 occupied by the impedance sensor 212 during the calculation period. The precipitation analyzer 220 may be further arranged to determine a precipitation signal on basis of the impedance signal and/or the precipitation profile. The relative amplitudes (i.e. changes in the measured signal) are converted to amplitudes using a calibrated function. The amplitude is closely related to both the size and the mass of a liquid precipitation particle While the precipitation profile describes the amplitude distribution of the observed precipitation particles, the precipitation signal is descriptive of both timing and amplitudes of precipitation particles falling on the area of the measurement surface 230 occupied by the impedance sensor 212. For clarity and brevity of description, in the following the precipitation signal derived on basis of the impedance signal may also be referred to as a first precipitation signal.

In order to derive the precipitation particle amplitudes for the precipitation signal or for the precipitation profile, the measured impedance signal(s) are first normalized into a range extending from a dry or essentially dry state of the measurement surface 230, corresponding to zero-valued impedance signal, and a wet state of the measurement surface 230. The conversion may be provided e.g. by calculating a slow average value and a factor descriptive of rapid changes in the impedance signal. The rapid changes in the impedance signal represent the precipitation particles falling on the impedance sensor 212 and, especially, size and timings of the precipitation particles. The absolute change in the impedance signal for a given rapid change is scaled (e.g. multiplied) by a scaling factor corresponding the slow average value, and the resulting precipitation profile indicates the scaled rapid changes in the impedance signal, while the precipitation signal, if determined, further indicates their timing with respect to each other. The scaling factor is typically highly non-linear function (e.g. $4^{th}$ power) of the slow average signal and it is determined in view of characteristics and construction of the measurement surface 230. Hence, the scaled rapid changes in the impedance signal in rain may be converted into peaks, each peak having amplitude that is directly proportional to the size or mass of the respective precipitation particle and hence serves to indicate the size/mass of the precipitation particle in relation to sizes/masses of the other precipitation particles. In other types of precipitation than rain, the amplitudes may not be directly proportional to the size/mass of the particles. The distribution of the amplitudes may constitute the precipitation profile, whereas the amplitudes together with the timings thereof may constitute precipitation signal.

The peaks that are useable to derive the precipitation profile and, possibly, the precipitation signal, may be normalized such that the amplitudes of the peaks are mapped to a predetermined scale descriptive of relative size/mass of liquid precipitation particles and hence reflect size/mass of the precipitation particles such that may be directly compared with precipitation particles of any precipitation profile or signal normalized to the same scale. Details of the conversion process depend e.g. on characteristics of the impedance sensor 212.

The precipitation analyzer 220 is further arranged to derive, on basis of the acoustic signal, a precipitation rate that is descriptive of an accumulated amount of precipitation, e.g. an accumulated mass of the precipitation particles falling on the measurement surface 230 or a surface in vicinity thereof during the calculation period. This precipitation rate derived on basis of the acoustic signal may be referred to, for clarity and brevity of description, as a second precipitation rate $R_2$.

In this regard, the precipitation analyzer 220 may be further arranged to convert the acoustic signal into a respective precipitation signal. Like the precipitation signal that may be derived on basis of the impedance signal, also the acoustic signal is descriptive of timing and relative amplitudes of precipitation particles observed in vicinity of the measurement surface 230 with the peaks of the acoustic signal indicating timing and (relative) sizes/masses of the corresponding precipitation particles. Instead of converting/deriving the precipitation signal on basis of the acoustic signal, the precipitation analyzer 220 may receive the precipitation signal from the (respective) acoustic sensor 214. For clarity and brevity of description, in the following the precipitation signal derived on basis of the acoustic signal may also be referred to as a second precipitation signal.

The acoustic signal inherently exhibits a format that corresponds to a precipitation signal. The conversion from the acoustic signal into a respective precipitation signal may comprise normalizing, e.g. scaling, the acoustic signal to form the respective precipitation signal in order to normalize the peaks of the acoustic signal into a predetermined scale that is descriptive of relative size/mass of liquid precipitation particles, preferably to the same scale applied for the precipitation profile (and possible for the precipitation signal) derived on basis of the impedance signal. Additionally or alternatively, the conversion may comprise filtering the noise-floor from the acoustic signal in order to improve detection of the peaks in the lower end of the scale and/or excluding (e.g. filtering) from the acoustic signal peaks that are smaller than a predetermined threshold in order to avoid peaks that are likely only disturbances from degrading the reliability of the precipitation characterization.

The conversion routines or functions for scaling and/or normalizing the impedance signal and the acoustic signal into respective precipitation profile or precipitation signal(s) may be configured based on known properties of the components applied in the respective sensors. Alternatively or additionally, the configuration of such conversion routines/functions may be carried out on basis of experimental data, for example on basis of typical liquid precipitation (rain) event (e.g. 1 to 2 mm/h), in order to ensure that the precipitation profile (and possibly precipitation signal) derived on basis of the impedance signal and the precipitation signal derived on basis of the acoustic signal indicate similar precipitation particle sizes/masses in relation to each other and preferably also similar precipitation intensity in comparison to that indicated for the same (or similar) precipitation event by a reference rain gauge or a reference disdrometer.

Figure 3A:
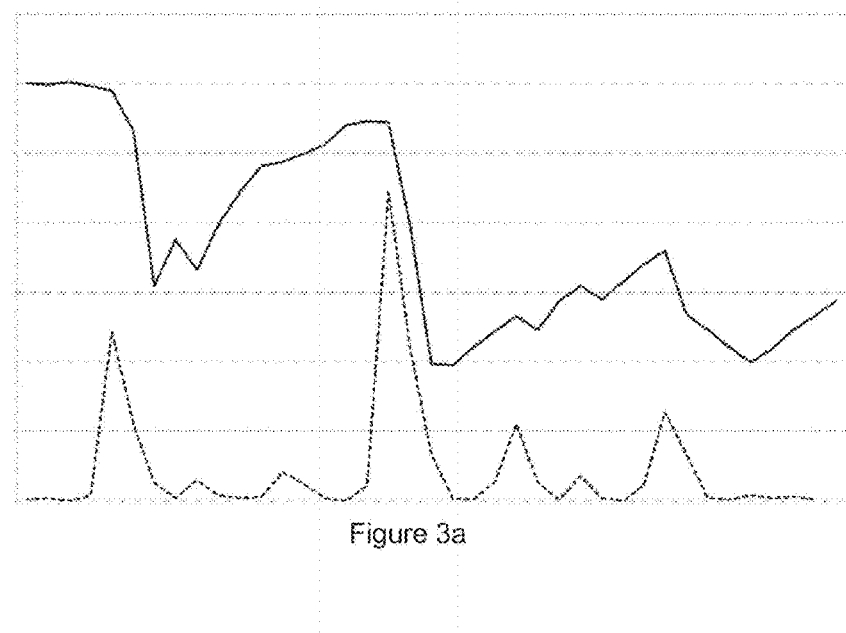
FIGS. 3*a* to 3*c* illustrate an exemplifying impedance signal and an exemplifying acoustic signal.
Figure 3B:
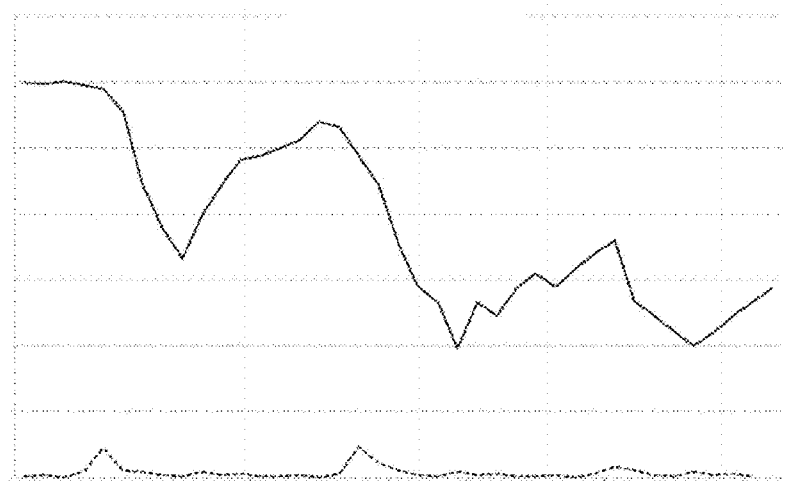
Figure 3C:
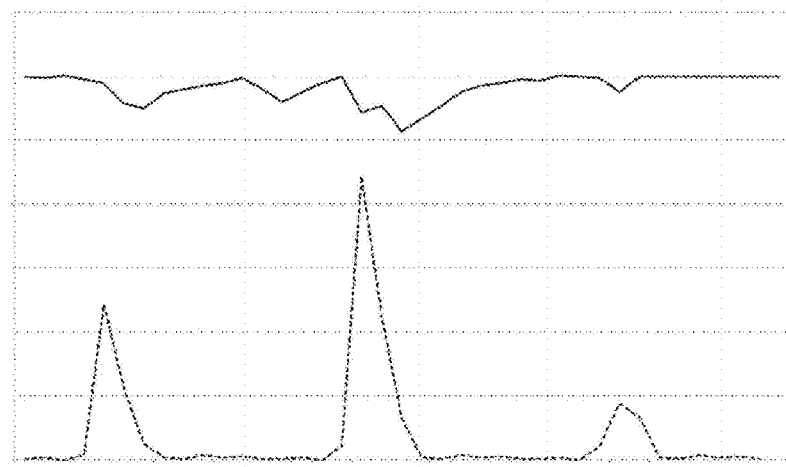

FIGS. 3a to 3c provides exemplifying illustrations of (temporally aligned) impedance signals and acoustic signals. Throughout FIGS. 3a to 3c, the solid curve represents an exemplifying impedance signal whereas the dashed curve represents a respective exemplifying acoustic signal. Moreover, in FIGS. 3a to 3c the x axis indicates time whereas the y axis indicates amplitude or intensity of the respective signal. In FIG. 3a the changes in the impedance signal (temporally) coincide with the peaks of the acoustic signal and the changes/peaks in both signals are rather prominent and also rather frequent. Such a similarity in characteristics of the impedance signal and the respective acoustic signal typically serve as an indication of liquid precipitation type (e.g. rain) In FIG. 3b the impedance signal exhibits prominent changes, whereas the acoustic signal exhibits only minor peaks (temporally) coinciding with the most prominent impedance changes. Such difference in characteristics of the impedance and acoustic signals typically serves as an indication of snow. In FIG. 3c the impedance signal exhibits only minor changes, while the acoustic signal exhibits infrequent prominent peaks that (temporally) coincide with some of the changes in the impedance signal. Such difference in characteristics of the impedance and acoustic signals typically serve as an indication of freezing snow because snowflakes typically have smaller density and lower falling speed than corresponding rain drops. Characterization of the precipitation type on basis of the impedance signal and the acoustic signal (and/or on basis of signals or indicators derived therefrom will be described in more detail in the following.

Figure 4:
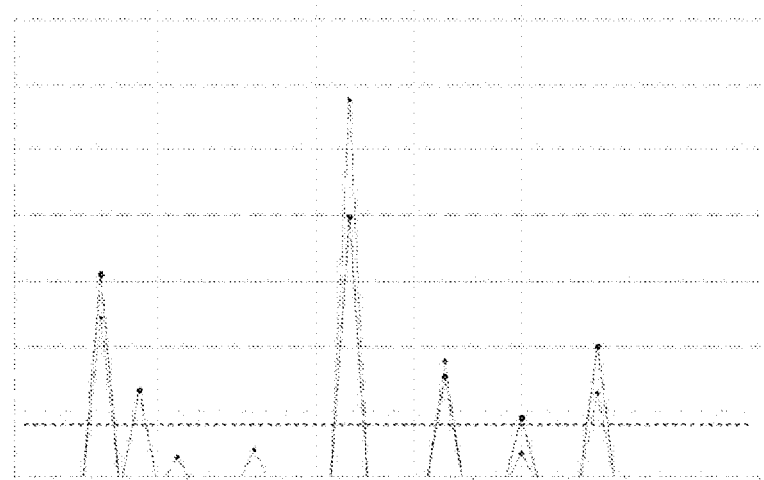
FIG. 4 illustrates of an example of temporally aligned precipitation signals.

FIG. 4 provides an illustration of exemplifying precipitation signals that are temporally aligned. In FIG. 4 the x axis indicates time whereas the y axis indicates amplitude (e.g. mass or size) of the respective precipitation particles. The curve with square-shaped markers indicates the peaks of a precipitation signal derived on basis of an exemplifying impedance signal, whereas the curve with diamond-shaped markers indicates the peaks of a precipitation signal derived on basis of an exemplifying acoustic signal. Both timing and magnitude of the peaks in these two precipitation signals correlate to a large extent, which typically serves as indication of liquid precipitation (e.g. rain), as described hereinbefore in context of FIG. 3a, The precipitation analyzer 220 is further configured to obtain an indication regarding presence or absence of precipitation. This may comprise receiving an indication regarding the presence or absence of precipitation from an external entity. The indication regarding the presence/absence of precipitation may be extracted using a technique known in the art, for example a technique based on optical measurement(s) or a technique based on combination of optical measurement(s) and impedance measurement(s).

Alternatively, the precipitation analyzer 220 may be configured to detect presence or absence of precipitation at least in part on basis of the impedance signal. Such detection may rely on the impedance signal indicating a change in impedance serving as an indication of one or more precipitation particles having fallen on the measurement surface 230. Instead of directly observing changes of the impedance signal, a change in a signal derived from the impedance signal may be considered. As an example, this detection may be carried out on basis of the precipitation profile or the precipitation signal derived on basis of the impedance signal. Such detecting may comprise, for example, designating the current condition as precipitation (i.e. detecting presence of precipitation) in response to the precipitation profile derived on basis of the impedance signal indicating a peak (i.e. precipitation particle size/mass) exceeding a precipitation threshold or in response to a peak in the precipitation signal derived on basis of the impedance signal exceeding the precipitation threshold. As another example, the precipitation analyzer 220 may be configured to detect the current condition as precipitation in response to peaks indicted in the precipitation profile or in the precipitation signal derived on basis of the impedance signal exceeding the precipitation threshold for at least a predetermined number of times within a predetermined period of time.

In contrast, the precipitation analyzer 220 may be arranged to detect and indicate absence of precipitation in response to the precipitation profile or the precipitation signal derived on basis of the impedance signal indicating peaks that are smaller than or equal to the precipitation threshold for a predetermined period of time—in other words in response to none of the peaks within the predetermined period of time exceeding the precipitation threshold for a duration of the predetermined period of time. As another example, the precipitation analyzer 220 may be configured to detect the current condition as absence of precipitation in response to the number of peaks indicated in the precipitation profile or in the precipitation signal derived on basis of the impedance signal that exceed the precipitation threshold within the predetermined period of time failing to reach a predetermined number.

In response to detecting presence of precipitation, the precipitation analyzer 220 is further configured to designate current precipitation type as one of predetermined precipitation types. In this regard, the precipitation analyzer 220 may be configured to derive one or more precipitation indicators and to designate the current precipitation type on basis of these precipitation indicators. The precipitation indicator(s) may be applied in the designation process as such, or the precipitation indicator(s) may be applied to further derive a number of precipitation type probability indicators. The precipitation type probability indicators are normalized descriptors derived on basis of the precipitation indicators and possibly further on basis of other signals. Such other signals may comprise e.g. an indication of the heating power applied in heating the measurement surface 230 and/or a temperature signal indicative of the dew point temperature or the wet bulb temperature. Applying the precipitation indicators and/or the precipitation type probability indicators in designating the current precipitation type may be implemented in one of a number of ways, depending on applied/desired designation approach. As an example, the precipitation sensor 200 may be arranged to designate the precipitation type as one of liquid precipitation, solid precipitation and mixed precipitation, where the mixed precipitation refers to a precipitation including both liquid and solid precipitation particles. This process may involve deriving a liquid precipitation type probability indicator LPW, a solid precipitation type probability indicator SPW and a mixed precipitation type probability indicator XPW. Each of LPW, SPW and XPW may be derived e.g. as a sum of or as a product of respective sub-indicators LPWi, SPWi and XPWi, each sub-indicator derived on basis of one or more at least partly independent precipitation indicators. It should be noted that these precipitation type probability indicators/sub-indicators do not indicate probabilities in the mathematical sense but rather serve as values that are indicative of probabilities of at least partly independent indicators/sub-indicators and that may be used as input for a voting or fuzzy logic style combining. These sub-indicators can be combined for a combined precipitation type (liquid, solid or mixed) and finally the combined type can be refined to a detailed precipitation type.

This designation may be based at least in part on the first precipitation rate $R_1$ and on the second precipitation rate $R_2$ described hereinbefore. A corresponding precipitation indicator may be derived e.g. as a ratio of the first precipitation rate and the second precipitation rate. For clarity and brevity of description, in the following the precipitation indicator derived on basis of the ratio of the first precipitation rate and the second precipitation rate is referred to as a first precipitation indicator $I_1$.

A precipitation rate, e.g. the first precipitation rate or the second precipitation rate, may be derived, for example, as a sum of precipitation particle sizes/masses indicated in the respective precipitation signal over the calculation period. As a particular example, the sum may be computed as a sum of precipitation particle sizes/masses exceeding a predetermined threshold (e.g. a threshold size or a threshold mass) in order to exclude possible noise component from the computation. Moreover, since majority of the accumulated precipitation typically originates from the precipitation particles having large size/mass, applying such a threshold also serves to exclude precipitation particles of smallest size/mass from the computation, thereby reducing the computational complexity involved in derivation of the respective precipitation rate without significantly affecting the accuracy of the resulting estimate.

As another example, a useful value for the first precipitation rate $R_1$ that is based on the impedance signal may be, alternatively, calculated without the explicit separation of the precipitation particles indicated by the impedance signal, for example, by using the impedance signal level, changes in the signal, as described hereinbefore in the particle size calculation, and the applied amount of the sensor heating power.

The duration of the calculation period (analysis period) applied in determination of the first precipitation rate $R_1$ and the second precipitation rate $R_2$ is selected in accordance with a desired update frequency of the information that characterizes the precipitation. As a non-limiting example, a calculation period duration in the range from 10 seconds up to 5 minutes, e.g. one minute, may be applied.

The precipitation analyzer 220 may be configured to compute the ratio of the first and second precipitation rates, e.g. as the second precipitation rate $R_2$ divided by the first precipitation rate $R_1$ and apply this ratio as the first precipitation indicator $I_1$, i.e. $I_1=R_2/R_1$. This ratio of precipitation rates may be also referred to as an intensity-ratio. A ratio that is close to unity may be considered as an indication of liquid precipitation, because the first and second precipitation rates are suggesting similar or essentially precipitation rates, i.e. similar amount of precipitation over the calculation period, and because both precipitation rates are based on profile/signal that have been calibrated to correspond to a liquid precipitation event (e.g. rain). In contrast, e.g. in case of snowflakes the precipitation profile (or the first precipitation signal) derived on basis of the impedance signal typically provides prominent peaks (due to high water content) and hence implies a high value for the first precipitation rate $R_1$ while the second precipitation signal derived on basis of the acoustic signal typically shows no or only very minor peaks implying a low value for the second precipitation rate $R_2$, leading to a low value of the ratio. On the other hand, e.g. in case of hail stones the precipitation profile (or the first precipitation signal) derived on basis of the impedance signal typically provides no or only very minor peaks, thereby suggesting a low value for the first precipitation rate $R_1$, while the second precipitation signal derived on basis of the acoustic signal typically shows prominent peaks implying a high value for the second precipitation rate $R_2$, thereby leading to a high value of the ratio. The scenario where none of the first precipitation rate $R_1$ and the second precipitation rate $R_2$ correspond prominent peaks/amplitudes in the respective precipitation profile/signal may be filtered out for example by setting the first precipitation indicator $I_1$ to zero or to another small value in response to both the first precipitation rate $R_1$ and the second precipitation rate $R_2$ failing to exceed a certain limit.

The precipitation analyzer 220 may be configured to apply the first precipitation indicator $I_1$ to directly designate the current precipitation type. Alternatively, the first precipitation indicator $I_1$ may be applied to set values for one or more precipitation type probability sub-indicators, including a first probability type sub-indicator for liquid precipitation LPW1, a first probability type sub-indicator for solid precipitation SPW1 and a first probability type sub-indicator for mixed precipitation XPW1. These sub-indicators may be applied to designate the current precipitation type, either as such or in combination with further respective sub-indicators derived on basis of other precipitation type indicator(s).

Figure 9:
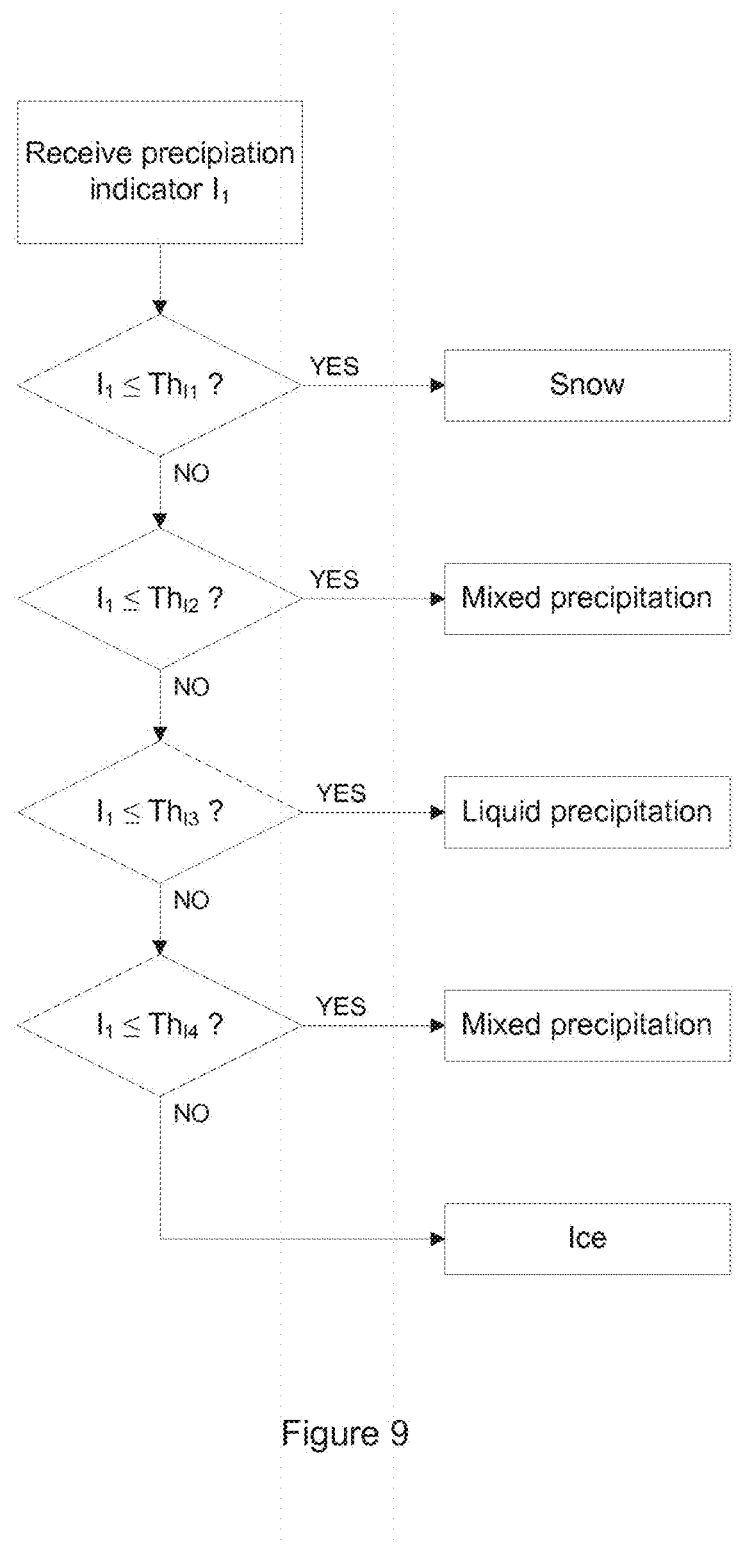
FIG. 9 illustrates an exemplifying process for designating the current precipitation type.

As an example of designating the current precipitation type directly on basis of the first precipitation indicator $I_1$, the precipitation analyzer 220 may be arranged to designate the precipitation type as liquid precipitation in response to the first precipitation indicator $I_1$ indicating an intensity-ratio that is within a predetermined range between a second intensity-ratio threshold $Th_{I2}$ and a third intensity-ratio threshold $Th_{I3}$ ($>Th_{I2}$). This range is, preferably, centered around one (e.g. $Th_{I2}<I_1<=Th_{I3}$, where $Th_{I2}=1-m$ and $Th_{I3}=1+m$). The precipitation analyzer 220 may be further arranged to designate the precipitation type as ice, e.g. hail, precipitation in response to said first precipitation indicator $I_1$ indicating an intensity-ratio that is higher than a fourth intensity-ratio threshold $Th_{I4}$ ($>Th_{I3}$). The precipitation analyzer 220 may be further configured to designate the precipitation as snow in response to the first precipitation indicator $I_1$ indicating an intensity-ratio that is smaller than or equal to a first predetermined intensity-ratio threshold $Th_{I3}$ ($<Th_{I2}$). If the first precipitation indicator $I_1$ indicates intensity-ratio that is between $Th_{I1}$, and $Th_{I2}$ or between $Th_{I3}$ and $Th_{I4}$, the precipitation analyzer 220 may be configured to designate the precipitation as mixed precipitation. An example of a process of designating the current precipitation type directly on basis of the first precipitation indicator $I_1$ is provided in FIG. 9. As non-limiting examples, the first, second, third and fourth intensity-ratio thresholds may be set e.g. to $Th_{r1}=0.2$, $Th_{r2}=0.75$ (<1), $Th_{r3}=1.25$ (>1). $Th_{r4}=4.0$.

Figure 10:
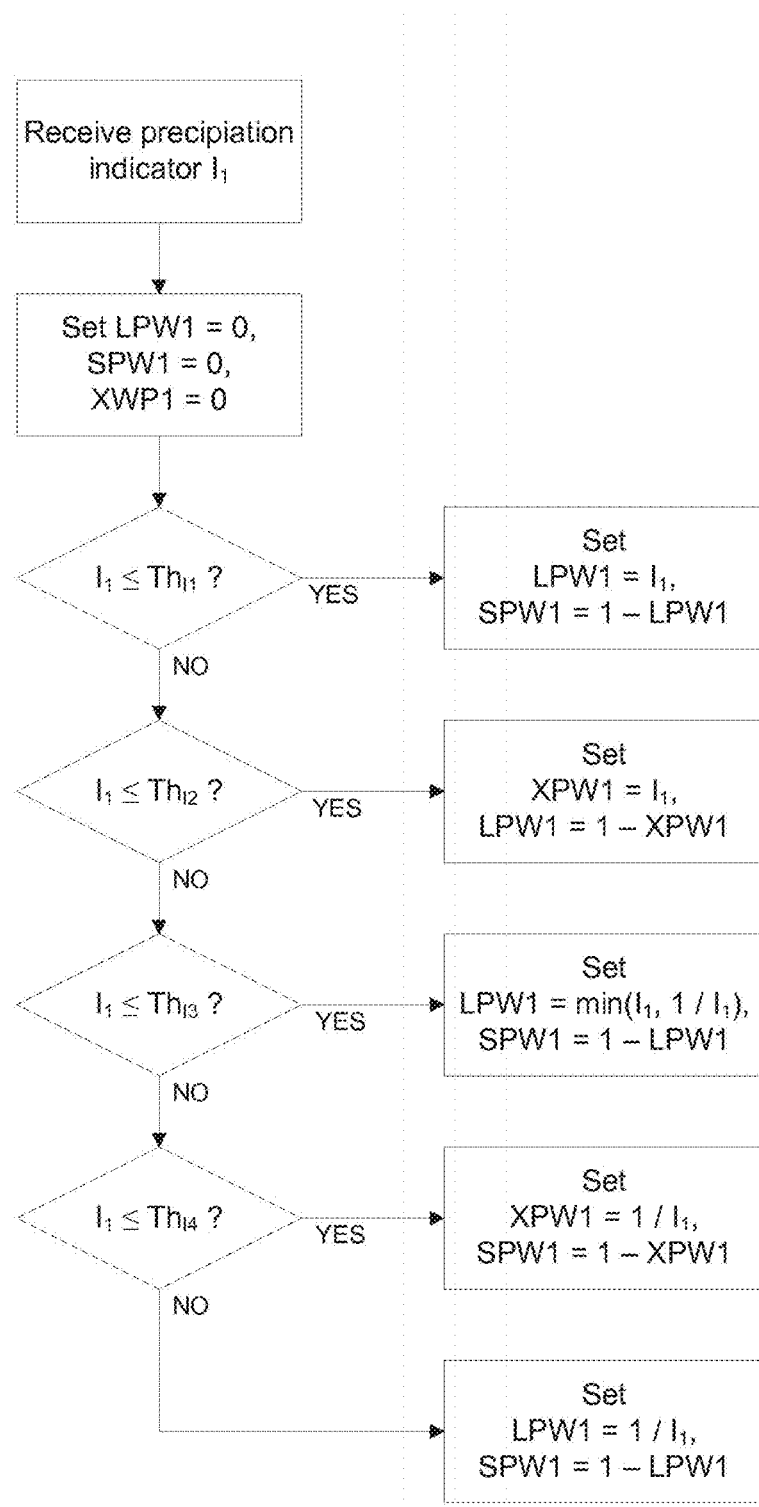
FIG. 10 illustrates an exemplifying process for setting the precipitation type probability sub-indicators for designation of the current precipitation type.

As an example of deriving the first precipitation type probability sub-indicators for subsequent designation of the current precipitation type, the precipitation analyzer 220 may be arranged to start the designation process by setting (or resetting) the first precipitation type probability sub-indicators to zero values, e.g. as LPW1=0; SPW1=0 and XPW1=0. The precipitation analyzer 220 may be further configured to set LPW1=min($I_1$, $1/I_1$) and SPW1=1–LPW1 in response to the first precipitation indicator $I_1$ indicating an intensity-ratio that is within the range between the second intensity-ratio threshold $Th_{r2}$ and the third intensity-ratio threshold $Th_{r3}$. Herein the function min(x, y) denotes a function that provides as an output the smaller of the two values x and y given as the arguments to the function. The precipitation analyzer 220 may be further arranged to set to LPW1=$1/I_1$ and SPW1=1–LPW1 in response to said first precipitation indicator $I_1$ indicating an intensity-ratio that is higher than the fourth intensity-ratio threshold $Th_{r4}$. The precipitation analyzer 220 may be further configured to set the sub-indicators to LPW1=$I_1$ and SPW1=1–LPW1 in response to the first precipitation indicator $I_1$ indicating an intensity-ratio that is smaller than or equal to the first predetermined intensity-ratio threshold $Th_{r1}$. If the intensity-ratio indicated by the first precipitation indicator $I_1$ is between $Th_{r1}$ and $Th_{r2}$ or between $Th_{r3}$ and $Th_{r4}$, the precipitation analyzer 220 may be configured to set the sub-indicators to XPW1=$I_1$ and LPW1=1–XPW1 when $I_1<1$ and/or to set XPW1=$1/I_1$ and SPW1=1–XPW1 when $I_1 \geq 1$. An example of a process of setting the precipitation type probability sub-indicators for designation of the current precipitation type on basis of the first precipitation indicator $I_1$ is provided in FIG. 10.

Additionally, when the precipitation intensity is so small, that no significant peaks in either the precipitation profile (or the first precipitation signal) or in the second precipitation signal can be detected, it may not be possible to determine a meaningful value for either the first precipitation rate $R_1$ or the second precipitation rate $R_2$. In such a case the precipitation type may be designated according to the applied surface heating power. If the applied heating power compared to the measured signal level exceeds a predetermined threshold, it can be considered as an indication of a large number of small liquid precipitation particles (i.e. drizzle, LPW1=1) hitting the measurement surface 230, whereas otherwise such low-intensity precipitation may be designated as solid precipitation (SPW1=1).

Instead of considering the above-mentioned three precipitation types (liquid solid, mixed), the precipitation sensor 200 may be configured to detect one of the precipitation types and hence to classify the precipitation to represent either the type of interest or one of the other types. As an example in this regard, the precipitation analyzer 220 may be arranged to designate the precipitation type as one of liquid precipitation and non-liquid precipitation, the non-liquid precipitation type including solid and mixed precipitation types. For such an approach, the precipitation analyzer 220 is arranged to designate the precipitation type as liquid precipitation (or set LPW1=1) in response to the first precipitation indicator $I_1$ indicating an intensity-ratio that is within the range between the second intensity-ratio threshold $Th_{r2}$ and the third intensity-ratio threshold $Th_{r3}$ (>$Th_{r2}$) and otherwise designate the current precipitation type as non-liquid precipitation. For the non-liquid precipitation the sub-indicators may be set to SPW1=min($I_1$, $1/I_1$) and XPW1=1–SPW1.

While according to the above example the direct comparison of the intensity-ratio indicated by the first precipitation indicator $I_1$ to the thresholds may yield the designated precipitation type without further considerations, in case the designation applies the sub-indicators LPW1, SPW1 and XPW1 a further step of finding the largest of the sub-indicators LPW1, SPW1, XPW1 follows, where the sub-indicator having the largest value determines the current precipitation type: in case LPW1 is the largest one, the precipitation type is designated as liquid precipitation, in case SPW1 is the largest one, the precipitation type is designated as solid precipitation (ice or snow), and in case XPW1 is the largest one, the precipitation type is designated as mixed precipitation.

In the above examples the first precipitation indicator derived as the ratio of the first precipitation rate $R_1$ and the second precipitation rate $R_2$. However, instead of applying the ratio of the first precipitation rate $R_1$ and the second precipitation rate $R_2$ as the first precipitation indicator $I_1$, the first precipitation indicator may be produced using another measure derived on basis of the precipitation rates $R_1$ and $R_2$. As an example, the first precipitation indicator may be derived as the difference between the second precipitation rate $R_2$ and the first precipitation rate $R_1$, e.g. as $I'_1=R_2-R_1$.

Figure 5:
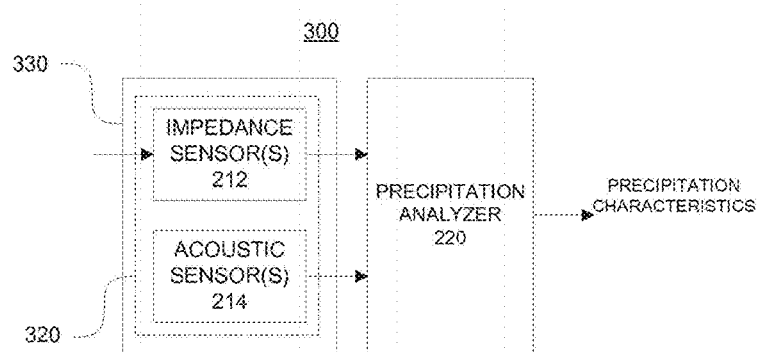
FIG. 5 schematically illustrates some components of an exemplifying precipitation sensor.

While the precipitation sensor 200 described hereinbefore provides reliable designation or detection of the current precipitation type, a further advanced variation of the precipitation sensor 200 further employs extent of similarity between the timing and sizes/masses of precipitation particles indicated on basis of the impedance signal and the acoustic signal, e.g. indicated in the first and second precipitation signals. FIG. 5 schematically illustrates some components of a precipitation sensor 300, provided as such a variation of the precipitation sensor 200.

In the precipitation sensor 300 both the impedance sensor(s) 212 and the acoustic sensor(s) 214 of a sensor portion 310 are arranged on the measurement surface 330 such that each acoustic sensor 214 is co-located or essentially co-located with respective impedance sensor 212. As described in context of the precipitation sensor 200, the acoustic sensor 214 may be provided e.g. as a miniature microphone or as a piezo electric transducer. In case the acoustic sensor 214 is provided as a piezo electric transducer, the sensing capacitor of the respective impedance sensor 212 may be constructed on the piezo element surface. A benefit of such a structure is that the piezo element may be further applied as a vibrator that facilitates removing loose water from the measurement surface 330 for improved reliability and accuracy of the impedance signal based analysis.

With the impedance sensor 212 and the respective acoustic sensor 214 sharing an area/position of the measurement surface 330, the acoustic signal received from the acoustic sensor 214 is directly indicative of acoustic impacts caused by precipitation particles falling on the area/position occupied by the respective impedance sensor 212. Therefore, the first and second precipitation signals derived on basis of the impedance signal and the acoustic signal (as described hereinbefore), are inherently temporally aligned and reflect similarity of both timing and amplitudes/sizes of precipitation particles falling on the measurement surface 330. In order to enable an analysis of temporal match between the precipitation indications by the impedance signal and the acoustic signal, the precipitation analyzer 220 of the precipitation sensor 300 is configured to derive the precipitation signal, i.e. the first precipitation signal, on basis of the impedance signal (as described hereinbefore as an optional processing step by the precipitation analyzer 220 of the precipitation sensor 200).

Consequently, the precipitation analyzer 220 of the precipitation sensor 300 is configured to designate the current precipitation type at least on basis of a precipitation indicator that is indicative of the extent of similarity in timing and sizes/masses of precipitation particles indicated on basis of the impedance signal and the acoustic signal, e.g. precipitation particles indicated in the first precipitation signal and those indicated in the second precipitation signal. This precipitation indicator is referred to as a second precipitation indicator $I_2$. The precipitation analyzer 220 of the precipitation sensor 300 may be arranged to designate the current precipitation on basis of the second precipitation indicator $I_2$ or on basis of both the first precipitation indicator $I_1$ and the second precipitation indicator $I_2$.

The second precipitation indicator $I_2$ may be derived on basis of the size/mass differences between simultaneous or essentially simultaneous precipitation particles indicated by the impedance and acoustic signals, e.g. as indicated in the first and second precipitation signals. The second precipitation indicator $I_2$ is derived on basis of segments of the impedance and acoustic signals during a calculation period, which preferably temporally coincides, either fully or at least in part, with the calculation period applied for determining the first precipitation rate $R_1$ and second precipitation rate $R_2$.

If applying the first and second precipitation signals as basis for deriving the second precipitation indicator $I_2$, the extent of similarity may be estimated e.g. by finding simultaneous or essentially simultaneous peaks in the first and second precipitation signals and computing a measure descriptive of the difference(s) therebetween. As an example, such an approach may involve applying the peaks in the second precipitation signal as a timing reference: for each peak of the second precipitation signal that is above a predefined threshold, the first precipitation signal is checked for an indication of a corresponding peak at or close (within a predefined time margin) to the same point of time. If a major portion of the peaks in the second precipitation signal have a similar or essentially similar and (essentially) temporally coinciding peak in the first precipitation signal, the precipitation type may be designed as rain, whereas in case only a minor portion of the peaks in the second precipitation signal have a similar or essentially similar temporally coinciding peak in the first precipitation signal, the precipitation type may be designed as ice. In other words, if the significant temporally coinciding peaks are not essentially similar, the precipitation is not liquid.

As an example of deriving the second precipitation indicator $I_2$ that is descriptive of the extent of similarity in timing and sizes/masses of precipitation particles indicated on basis of the impedance signal and on basis of the acoustic signal may be derived on basis of sizes/masses of simultaneous or essentially simultaneous precipitation particles indicated in the second and first precipitation signals within the second observation period. This determination of the extent of similarity may consider e.g. all peaks indicated in either of the first and second precipitation signals, only peaks indicated in the first precipitation signal or only peaks indicated in the second precipitation signal. Furthermore, the determination of the extent of similarity may consider only peaks that are higher (i.e. precipitation particle sizes/masses larger) than a predefined threshold. First, for each precipitation particle considered in the derivation, with $P_A$ indicating a mass of precipitation particle indicated on basis of the acoustic signal (e.g. a peak in the second precipitation signal) and $P_I$ indicating the mass of temporally coinciding precipitation particle indicated on basis of the impedance signal (e.g. a peak in the first precipitation signal), calculate $N=sum(P_A+P_I)/2$ for all considered particles in the respective precipitation signals. Secondly, calculate $S=sum(P_A-P_I)$ to indicate the sum of differences between temporally coinciding precipitation particle indications. Finally, calculate the second precipitation indicator $I_2$ as a similarity measure, e.g. as $I_2=S/N$.

The second precipitation indicator $I_2$ may be applied in designation of the current precipitation type as such, or it may be applied to set values for one or more precipitation type probability sub-indicators, including a second probability sub-indicator for liquid precipitation LPW2, a second probability sub-indicator for solid precipitation SPW2 and a second probability sub-indicator for mixed precipitation XPW2. These sub-indicators may be applied to designate the current precipitation type, either as such or in combination with respective first sub-indicators LPW1, SPW1, XPW1 and/or in combination with further respective sub-indicators derived on basis of other precipitation type indicator(s). As described hereinbefore in context of derivation of the first precipitation type probability sub-indicators, also the second precipitation type probability sub-indicators are set (or reset) to zero values as the first step of the designation process, e.g. LPW2=0, SPW2=0 and XPW2=0.

The precipitation analyzer 220 may be configured to carry out the analysis to derive the measure descriptive of the extent of similarity only in case the number of peaks indicated in the second precipitation signal and/or the (average) size/mass indicated for those peaks indicate a significant precipitation rate. As an example in this regard, the measure descriptive of the extent of similarity may be derived in case the second precipitation rate $R_2$ exceeds a predefined threshold.

A value close to zero of the second precipitation indicator/ serves as an indication of high degree of similarity between timing and sizes/masses of the precipitation particles indicated in the first and second precipitation signals (suggesting the impedance changes and acoustic impacts to indicate precipitation particles of similar size/amplitude at similar times) and therefore as an indication of a high likelihood of the precipitation to be rain or other liquid precipitation. This may result in designating the current precipitation type as liquid precipitation. In contrast, a value of the second precipitation indicator $I_2$ clearly lower or clearly higher than one serves as an indication of low degree of similarity between timing and sizes/masses of the precipitation particles indicated in the first and second precipitation signals (suggesting the impedance changes and acoustic impacts to indicate differences in timing and/or sizes/masses of precipitation particles) and therefore as an indication of a low likelihood of the precipitation to be rain or other liquid precipitation. In particular, a value close to one may serve as an indication of ice (e.g. hail), a moderately low or a moderately high value may serve as an indication of sleet, and a really low value may serve as an indication of snow.

Figure 11:
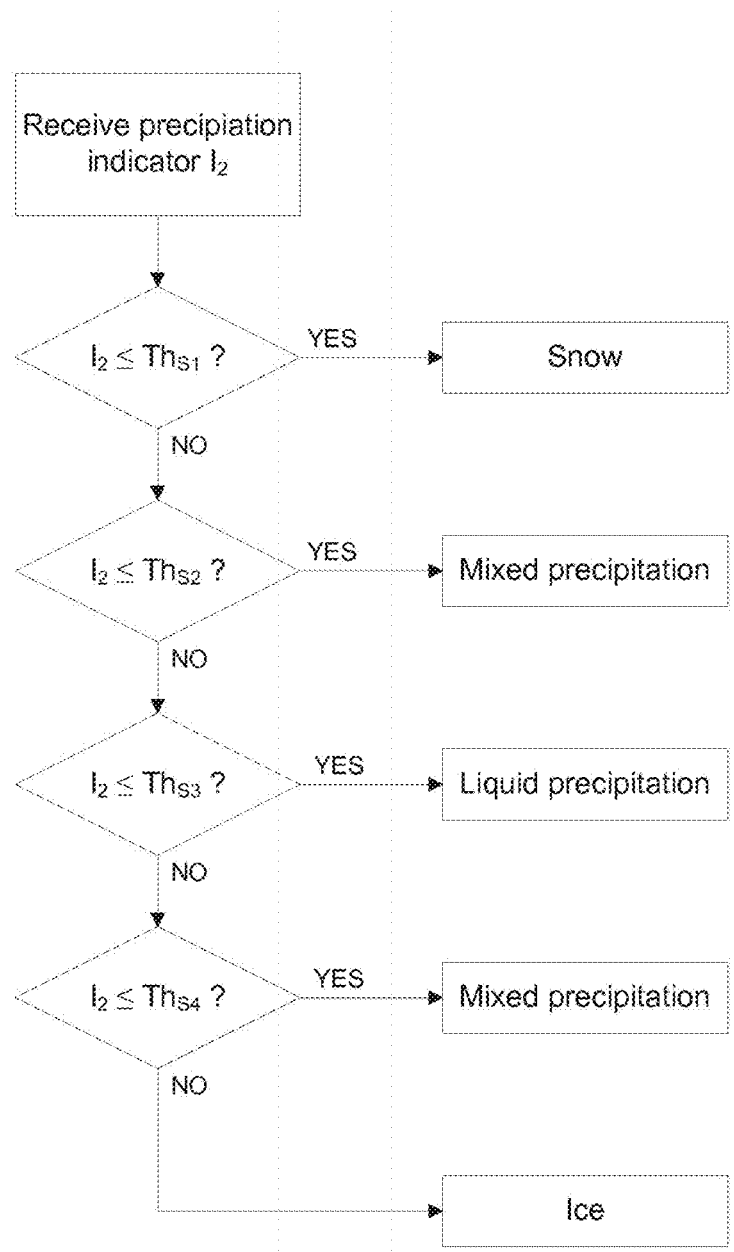
FIG. 11 illustrates an exemplifying process for designating the current precipitation type.

Consequently, as an example of applying the second precipitation indicator $I_2$ directly in designation of the current precipitation type, the precipitation analyzer 220 may be configured to designate the current precipitation type as snow in response to the second precipitation indicator $I_2$ failing to exceed a first predetermined similarity threshold $Th_{S1}$. The precipitation analyzer 220 may be configured to designate the current precipitation type as liquid precipitation in response to the second precipitation indicator $I_2$ exceeding a second predetermined similarity threshold $Th_{S2}$ ($>Th_{S1}$) but failing to exceed a third predetermined similarity threshold $Th_{S3}$ ($>Th_{S2}$). The second similarity threshold $Th_{S2}$ and the third similarity threshold $Th_{S3}$ preferably define a range around zero, i.e. $Th_{S2}<0<Th_{S3}$. The precipitation analyzer 220 may be configured to designate the precipitation type as ice (e.g. hail) in response to the second precipitation indicator $I_2$ exceeding a fourth predetermined similarity threshold $Th_{S4}$. The precipitation analyzer 220 may be configured to designate the current precipitation type as mixed precipitation in response to the second precipitation indicator $I_2$ exceeding the first similarity threshold $Th_{S1}$ but failing to exceed the second similarity threshold $Th_{S2}$ or the second precipitation indicator $I_2$ exceeding the third similarity threshold $Th_{S3}$ but failing to exceed the fourth similarity threshold $Th_{S4}$. An example of a process of designating the current precipitation type directly on basis of the second precipitation indicator $I_2$ is provided in FIG. 11. As non-limiting examples, the first, second, third, fourth and fifth similarity thresholds may be set e.g. to $Th_{S1}=-0.5$, $Th_{S2}=-0.2$, $Th_{S3}=0.4$, $Th_{S4}=0.8$.

Figure 12:
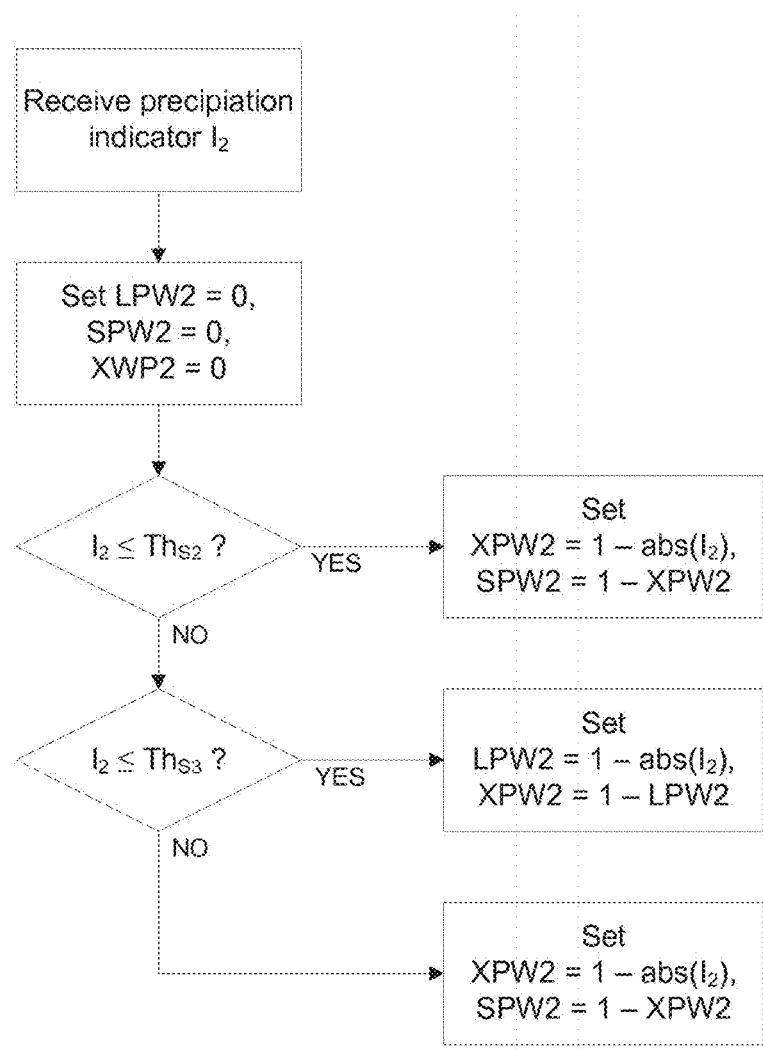
FIG. 12 illustrates an exemplifying process for setting the precipitation type probability sub-indicators for designation of the current precipitation type.

As an example of deriving the second precipitation type probability sub-indicators for subsequent designation of the current precipitation type as one of liquid, solid or mixed precipitation, the precipitation analyzer 220 may be arranged to start the designation process by setting (or resetting) the second precipitation type probability sub-indicators to zero values, e.g. as LPW2=0; SPW2=0 and XPW2=0. The precipitation analyzer 220 may be configured to set LPW2=(1−abs($I_2$)) and XPW2=1−LPW2 in response to the second precipitation indicator $I_2$ exceeding the second similarity threshold $Th_{s2}$ but failing to exceed the third similarity threshold $Th_{S3}$. Herein the function abs(x) denotes a function that provides as an output the absolute value of the number x given as the argument. For other values of the second precipitation indicator the precipitation analyzer 220 may be configured to set XPW2=(1−abs($I_2$)) and SPW2=1−XPW2. An example of a process of setting the precipitation type probability sub-indicators for designation of the current precipitation type on basis of the second precipitation indicator $I_2$ is provided in FIG. 12. However, in the latter case, if the number of peaks in the second precipitation signal and/or the sizes/masses indicated therefor are regardless significant (e.g. the second precipitation rate $R_2$ exceeding the threshold), there is a high likelihood of the precipitation to be ice (e.g. hail) and thus the sub-indicator may be set to SPW2=1 instead.

The precipitation analyzer 220 of the precipitation sensor 300 may be arranged to jointly apply the first precipitation indicator 1I and the second precipitation indicator $I_2$ in designating the current precipitation type into one of the predetermined precipitation types, e.g. into one of liquid precipitation, solid precipitation and mixed precipitation. As an example, such joint designation may apply the designation directly on basis of the second precipitation indicator $I_2$ (e.g. according to the example described hereinbefore) in response to the number of peaks in the second precipitation signal and/or the sizes/masses indicated therefore being significant (e.g. the second precipitation rate $R_2$ exceeding the threshold), and otherwise designate the precipitation type directly on basis of the first precipitation indicator $I_1$ (e.g. according to the example described hereinbefore).

As another example in this regard, the precipitation analyzer 220 may be configured to combine the second precipitation type probability sub-indicators into respective first precipitation type probability sub-indicators. This may comprise providing the value of a precipitation type probability indicator as the sum of the values of the respective precipitation type probability sub-indicators, e.g.

$$LPW=LPW1+LPW2,$$

$$SPW=SPW1+SW2, \text{ and}$$

$$XPW=XPW1+XPW2.$$

Figure 13:
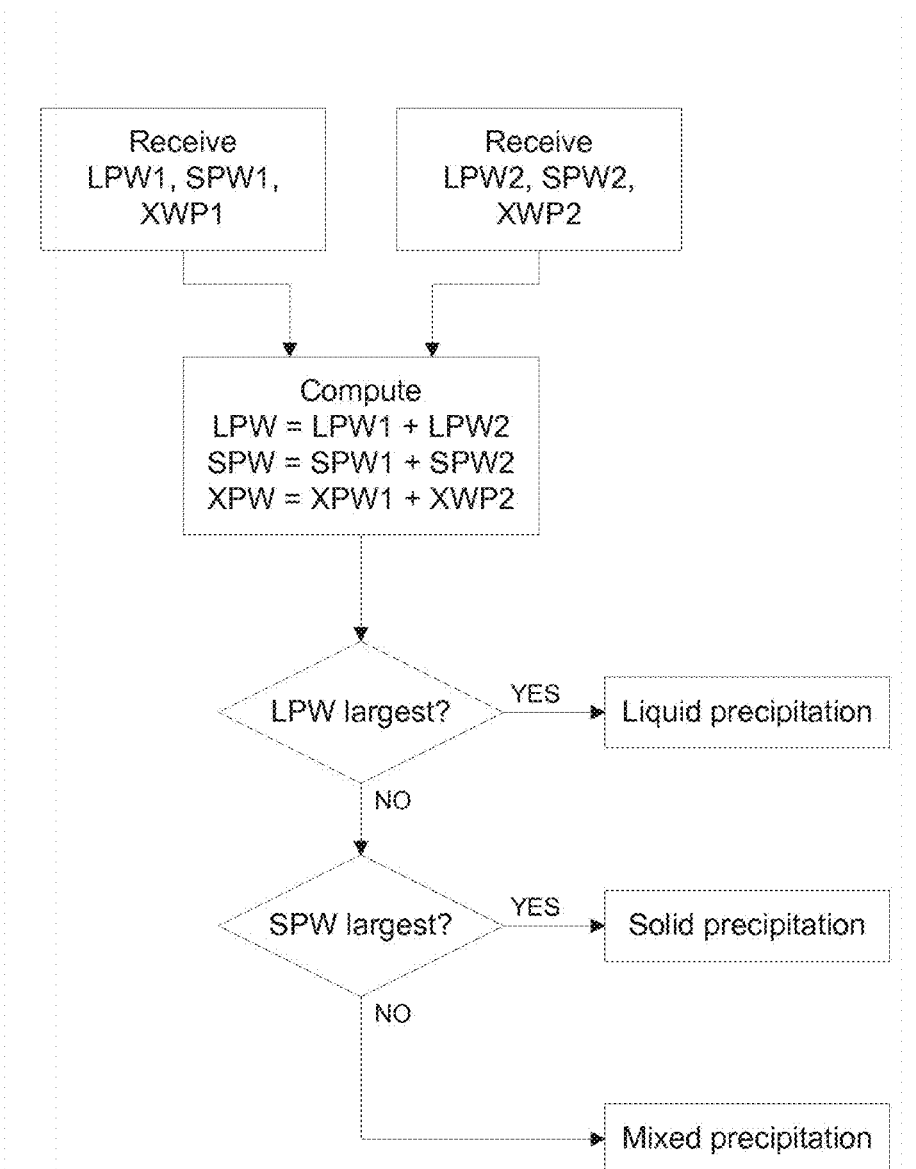
FIG. 13 illustrates an exemplifying process for designating the current precipitation type on basis of precipitation type probability sub-indicators.

Consequently, the precipitation analyzer 220 may be arranged to find the largest of the LPW, SPW and XPW and designate the current precipitation type as the precipitation type associated with the precipitation type probability indicator having the largest value. An exemplifying process in this regard is depicted in FIG. 13. As a variation of the above-described approach involving usage of the precipitation type probability sub-indicators, the combination of the precipitation type probability sub-indicators may be provided as the product of the values of the respective precipitation type probability sub-indicators.

Indication of a so called wet bulb temperature may serve as further input data to the precipitation type designation process. In precipitation the temperature of the precipitation particles drifts towards the so-called wet bulb temperature. When the wet bulb temperature is below freezing (0° C.), the precipitation particles are almost certainly frozen or will soon freeze. During precipitation, especially in rain, the air humidity is high and the difference between wet bulb temperature and dew point is small and both change according to the same physical process. Therefore, it may not be necessary to have exact knowledge of the wet bulb temperature, but knowledge of the dew point data may be applied to facilitate estimating the state of the precipitation particles instead. This is useful since calculating the wet bulb temperature requires the (dry) air temperature to be known, while input data that enables estimation of the dew point temperature may be made more readily available in all kind of operating conditions (e.g. inside the heated and ventilated precipitation sensor body).

In a scenario where the precipitation contains water droplets and rainfall continues, the air humidity usually settles to approximately 85 to 95%. In such a situation the dew point is typically 1 to 3° C. lower than the air temperature and the wet bulb temperature is in the half way between the air temperature and the dew point temperature. Based on net heat balance calculations of the precipitation particles it can be estimated that when the dew point temperature is higher than e.g. 1=C a liquid precipitation type (e.g. rain) is usually encountered, whereas when the dew point temperature is less than e.g. −0.5° C. the precipitation type is usually snow. Otherwise, the precipitation type may be mixed precipitation, e.g. it may be raining and snowing simultaneously. Exceptions to this general rule, though, may occur due to various reasons, for example due to the fact that the conditions somewhat higher above the ground are different from those close to the ground or due to the conditions are rapidly changing so that the precipitation particles do not have time to achieve the balance with the ambient air temperature and humidity. Therefore, knowledge of the dew point temperature (or the wet bulb temperature) alone is typically not sufficient to characterize the current precipitation type. In a typical scenario that may result in mixed precipitation, snow particles are falling to a warm (e.g. dew point temperature above 0° C.) and humid air layer where the humidity of the air may condense on the snow particle. For some snow particles the energy released in the condensation may even melt the snow particle, reduces relative humidity of the air in its vicinity and contribute to reducing the dew point temperature towards the melting temperature 0° C.

Figure 6:
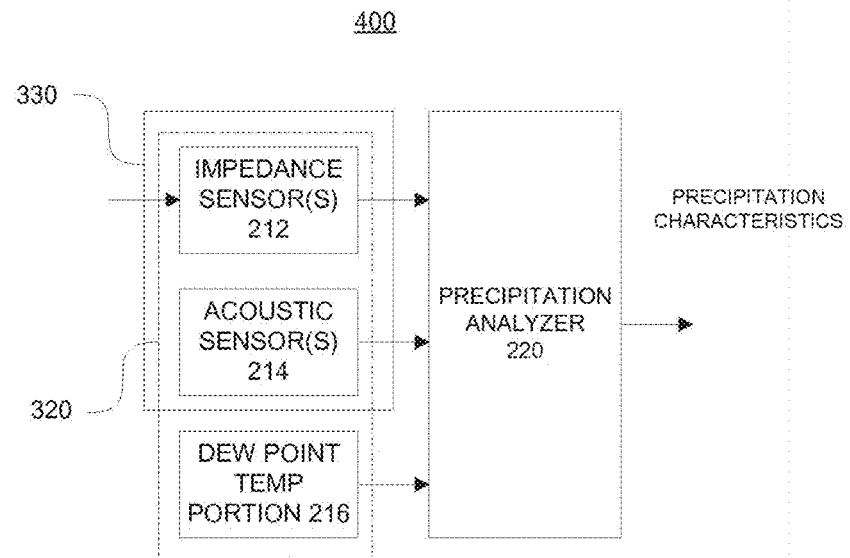
FIG. 6 schematically illustrates some components of an exemplifying precipitation sensor.
Figure 8:
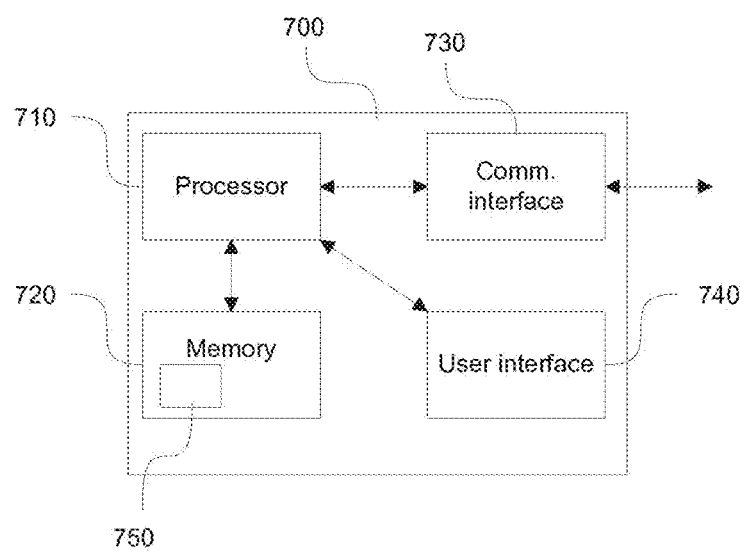
FIG. 8 schematically illustrates some components of an exemplifying apparatus for embodying a precipitation sensor.

FIG. 6 schematically illustrates a precipitation sensor 400 for characterizing precipitation, again within the framework of the arrangement 100. The precipitation sensor 400 is depicted with a structure similar to that of the precipitation sensor 300 in providing the acoustic sensor(s) 214 co-located with the impedance sensor(s) 212, with the addition of a dew point temperature portion 416. The dew point temperature portion 216 is arranged to obtain a temperature signal and provide the temperature signal to the precipitation analyzer 220. The temperature signal is indicative of the dew point temperature or the wet bulb temperature of ambient air around or close to the device implementing the precipitation sensor 400. The temperature signal may be received from an external entity.

Alternatively, the dew point temperature portion 216 may be configured to measure parameters that enable estimation of the dew point temperature and provide the estimated dew point temperature in the temperature signal to the precipitation analyzer 220. As an example in this regard, the dew point temperature portion 216 is arranged to measure air temperature T and relative humidity Rh in vicinity of the measurement surface 330 or in vicinity of the precipitation sensor 400 in general as the parameters that are useable for estimating the dew point temperature. Consequently, the dew point temperature portion 216 may be arranged to compute an estimate of the dew point temperature $T_d$ as $T_d = T_0 * (\ln(Rh/100) + ((f*T)/(T_0+T)))/(f-\ln(Rh/100)-((f*T)/(T_0+T)))$, where f is a gain factor that may be set e.g. to value 17.625 and where $T_0$ may be set e.g. to value 243.04° C. and provide the estimated dew point temperature in the temperature signal to the precipitation analyzer 220.

Consequently, the precipitation analyzer 220 of the precipitation sensor 400 is configured to receive the temperature signal and to designate the current precipitation type into one of the predetermined precipitation types further on basis of the temperature signal and/or variations thereof. In other words, the designation of the precipitation type may be carried out e.g. jointly on basis of the first precipitation indicator $I_1$ and/or the second precipitation indicator $I_2$, together the information derived from the temperature signal or jointly on basis of the first precipitation indicator, the second precipitation indicator and the information derived from the temperature signal.

In this regard, the designation of the precipitation type may involve determining a third precipitation indicator $I_3$ on basis of the temperature signal over a third calculation period, which preferably temporally coincides, either fully or at least in part, with the calculation period applied for determining the first and second precipitation rates and/or with the second calculation period.

The third precipitation indicator $I_3$ may be applied to set values for one or more precipitation type probability sub-indicators, including a third probability sub-indicator for liquid precipitation LPW3, a third probability sub-indicator for solid precipitation SPW3 and a third probability sub-indicator for mixed precipitation XPW3. These sub-indicators may be applied to designate the current precipitation type, either as such or in combination with respective first sub-indicators LPW1, SPW1, XPW1, with respective second sub-indicators LPW2, SPW2, XPW2 and/or in combination with further respective precipitation sub-indicators derived on basis of other precipitation type indicator(s).

Figure 14:
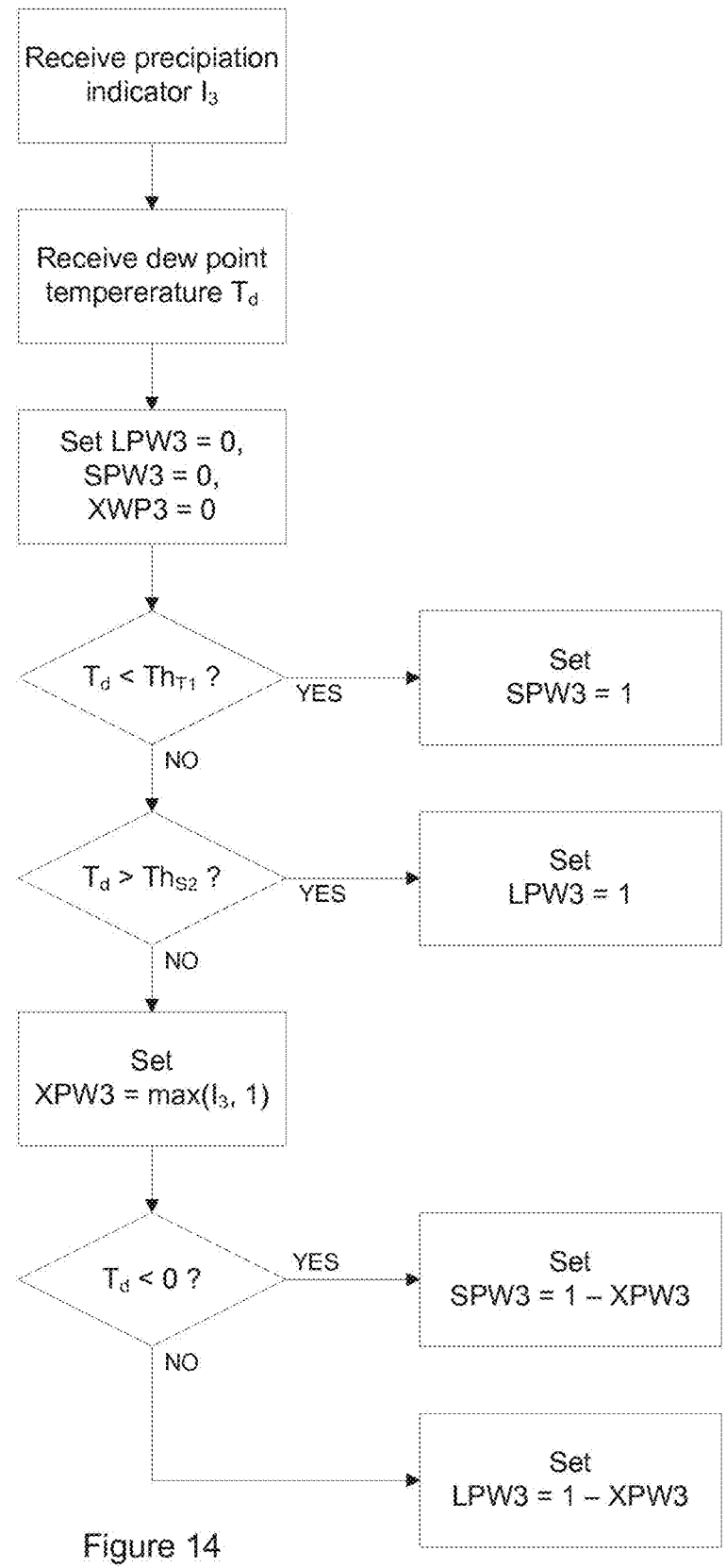
FIG. 14 illustrates an exemplifying process for setting the precipitation type probability sub-indicators for designation of the current precipitation type.

The third precipitation indicator $I_3$ may be set to a first (predefined) value that indicates liquid precipitation (and/or setting LPW3=1) in response to the temperature signal indicating dew point temperature $T_d$ above a first predetermined temperature threshold (e.g. $T_d > Th_{T2}$, where $Th_{T2}$=3° C.) and the third precipitation indicator $I_3$ may be set to a second (predefined) value that serves to indicate solid precipitation (and/or set SPW3=1) in response to the temperature signal indicating dew point temperature $T_d$ below a second predetermined temperature threshold (e.g. $T_d < Th_{T1}$, where $Th_{T1}$=−0.5° C.). A range different from the one exemplified herein (−0.5 to 3° C.) of essentially comparable width around 0° C. may be applied instead. In contrast, in response to the temperature signal indicating dew point temperature $T_d$ within said temperature range, the third precipitation indicator $I_3$ may be derived on basis of the dew point temperature $T_d$ and the difference between short-term variation in the dew point temperature $T_d$ and long-term variation in the dew point temperature $T_d$. The short-term variation $D_S$ may be determined as the difference between the highest and lowest dew point temperature $T_d$ within the most recent period of 15 minutes (or within a different period e.g. in the range from 5 to 20 minutes calculated to ° C./h), whereas the long-term variation $D_L$ may be determined as the difference between the highest and lowest dew point temperature $T_d$ within the most recent observation period of one hour (or within another observation period e.g. in the range from 30 to 90 minutes calculated to ° C./h). This difference value D indicative of the difference between the short-term and long-term variations in the dew point temperature $T_d$, derived e.g. as $D=abs(D_L-D_S)$, may be further multiplied by a multiplier k, e.g. by a value in the range 1.5 to 4, for example k=2, to set the final value for the third precipitation indicator $I_3$, e.g. as $I_3=k*D$. Moreover, the sub-indicator XPW3 may be set to a value equal to the third precipitation indicator $I_3$. The value of the third sub-indicator XPW3, when the dew point temperature $T_d$ is within the predetermined temperature range (near/around 0° C., as described hereinbefore), may be limited to be at most 1. If the dew point temperature $T_d$ is above 0° C., LPW3 may be set to LPW3=1−XPW3, while otherwise setting SPW3=1−XPW3. An example of a process of setting the precipitation type probability sub-indicators for designation of the current precipitation type on basis of the dew point temperature $T_d$ and on basis third precipitation indicator $I_3$ is provided in FIG. 14.

Figure 15:
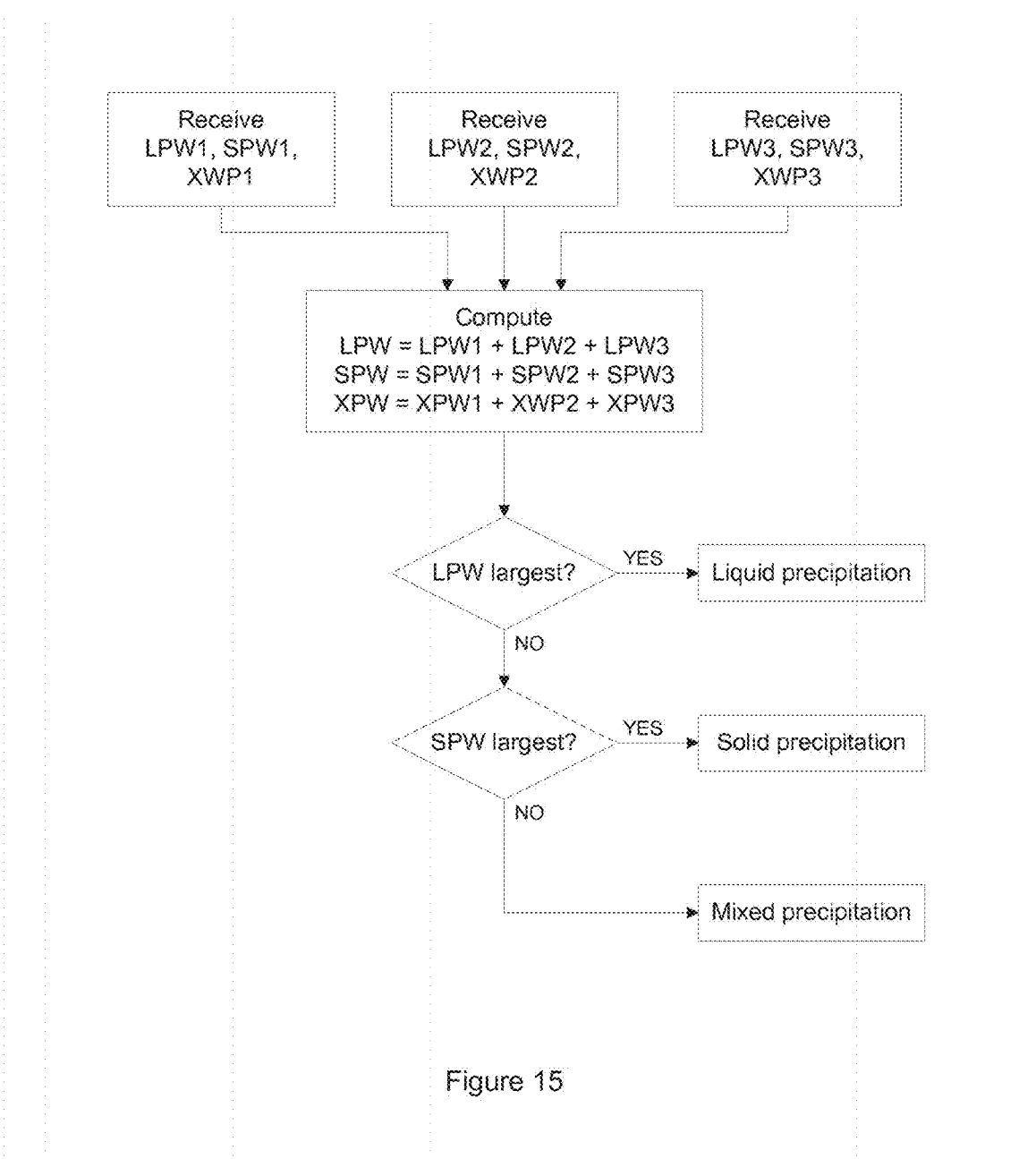
FIG. 15 illustrates an exemplifying process for designating the current precipitation type on basis of precipitation type probability sub-indicators.

If considering contribution from each of the first, second and third precipitation type probability sub-indictors in designation of the current precipitation type, each of the probability indicators LPW, SPW, XPW may be determined as the sum of respective sub-indicators, i.e. LPW=LPW1+LPW2+LPW3, SPW=SPW1+SPW2+SPW3 and XPW=XPW1+XPW2+XPW3. If the first probability indicator LPW is the largest of the three probability indicators, the precipitation type is designated as liquid precipitation. If the second probability indicator SPW is the largest of the three probability indicators, the precipitation type is designated as solid precipitation. If the third probability indicator XPW is the largest of the three probability indicators, the precipitation type is designated as mixed precipitation. An exemplifying process in this regard is depicted in FIG. 15

As a variation of the precipitation designation technique involving contribution of the third precipitation indicator, the computation of the precipitation type probability indicators LPW, SPW, XPW may consider only the respective first and third sub-indicators, i.e. LPW=LPW1+LPW3, SPW=SPW1+SPW3 and XPW=XPW1+XPW3, thereby designating the precipitation type on basis of the first and third precipitation type probability sub-indicators, e.g. on basis of the ratio of the first precipitation rate $R_1$ and the second precipitation rate $R_2$ and the dew point temperature indicated in the temperature signal.

As another variation of the precipitation designation technique involving contribution of the third precipitation type probability sub-indicators, the computation of the probability indicators LPW, SPW, XPW may consider only the respective second and third sub-indicators, i.e. LPW=LPW2+LPW3, SPW=SPW2+SPW3 and XPW=XPW2+XPW3, thereby designating the precipitation type on basis of the second and third precipitation type probability sub-indicators, i.e. on basis of the extent of similarity between the sizes/masses of precipitation particles indicated on basis of the impedance and acoustic signals and the dew point temperature indicated in the temperature signal.

As a yet further example, the precipitation designation based on the precipitation type probability indicators and respective sub-indicators may consider further sub-indicators that are derived on basis of further precipitation indicators and/or further signals. As an example in this regard, the computation of the probability indicators as a sum of the respective sub-indicators may further include contribution of fourth sub-indicators LPW4, SPW4, XPW4 derived on basis of indications of particles sizes/masses obtained from optical measurements.

In a variation of the precipitation type designation approaches described hereinbefore the designation algorithm may, for example, weight the precipitation type probability sub-indicators by their estimated relevancy. For example the above-mentioned second sub-indicators may be considered less relevant in lower precipitation rates and the values of the corresponding sub-indicators may be scaled to lower values when the precipitation rate below a certain threshold is identified. Similarly, the first sub-indicators may be considered less relevant in high precipitation intensities, when the dynamics (and hence accuracy) of the impedance measurement may become limited. Consequently, some or all of the thresholds applied in the exemplifying designation approaches described hereinbefore may be variable instead of applying fixed thresholds. In other words, any of the above-mentioned thresholds, e.g. $Th_{I1}$, $Th_{I2}$, $Th_{I3}$, $Th_{I4}$, $Th_{S1}$, $Th_{S2}$, $Th_{S3}$ and $Th_{S4}$, may be, alternatively, determined for example as a function of precipitation rate (e.g. the first precipitation rate $R_1$ and/or the second precipitation rate $R_2$) and/or precipitation particle count.

While for some applications it may be sufficient to designate the current precipitation type into one of liquid precipitation (e.g. rain), solid precipitation (e.g. snow) and mixed precipitation (e.g. a mixture of rain and snow), some applications are likely to benefit from even more detailed precipitation type designation. Hence, the precipitation analyzer 220 may be configured to further designate the designated (higher-level) precipitation type into one of respective subtypes.

As an example in this regard, liquid precipitation may be designated as drizzle, if the acoustic signal is essentially missing (e.g. if the second precipitation signal indicates no prominent peaks) and a significant amount of heating power is needed to evaporate the water from the measurement surface 230. Further, the rain and drizzle types may be designated as freezing drizzle or freezing rain, when the dew point temperature is below 0.0° C. Even the mixed precipitation type may be designated e.g. as freezing mixture of rain and snow. The solid precipitation type may be designated as hail or ice pellets instead of snow. The solid precipitation may be identified as ice when the acoustic signal is significant (e.g. the second precipitation signal indicates prominent peaks) and the impedance signal is very low (e.g. the first precipitation signal indicates no prominent peaks). Ice precipitation may be designated as ice pellets, if the dew point temperature is below 0.0° C., whereas otherwise it is designated hail.

The precipitation type is an important factor that may be used in calculation of the generic liquid water equivalent intensity of the precipitation, because the measured intensity rates are precipitation type and intensity dependent. Acoustic sensors are known to measure moderate and heavy rain with good accuracy but are, typically, considered less accurate for other types of precipitation. Consequently, the liquid precipitation intensity may be calculated as a weighed function of the impedance based precipitation rate (e.g. the first precipitation rate $R_1$) and acoustic measurement based precipitation rate (e.g. the second precipitation rate $R_2$). E.g. if the acoustic signal based precipitation rate is above 5 mm/h, it may be used as such. For lower precipitation rates the acoustic signal based precipitation rate may be weighed by a weighting factor, e.g. 1/5 (i.e. as $R_2/5$) and the impedance signal based precipitation rate is weighed by 1−the acoustic weighting factor (e.g. as $(1-1/5)*R_1$) and estimated precipitation rate is provided as the sum of the weighed precipitation rates. For solid and mixed precipitation types it may be advantageous to use a scaled sum of the impedance signal based precipitation rate and the acoustic signal based precipitation rate to reliably estimate also the most icy precipitation events.

Once determined, the liquid water equivalent intensity of the precipitation may be integrated over time to determine or estimate the respective accumulated precipitation during a period of interest.

Figure 7:
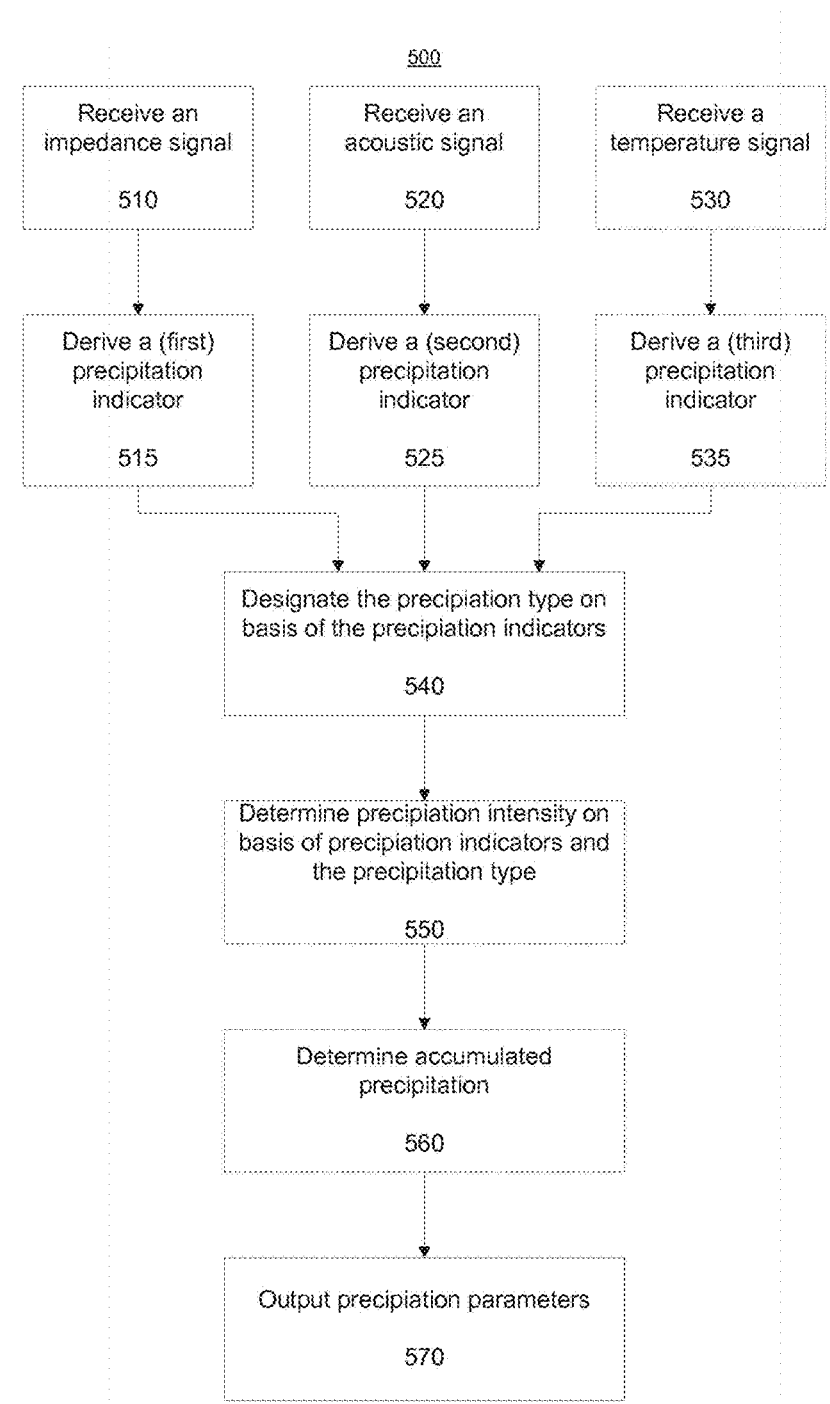
FIG. 7 illustrates an exemplifying method for characterizing precipitation.

The operations, procedures and/or functions assigned to the components of the precipitation sensor 200, 300, 400, to the precipitation analyzer 220 in particular, may be described as steps of a method. As an example of this regard, FIG. 7 illustrates a method 500. The method 500 serves as a method for characterizing precipitation. The method 500 comprises receiving two or more measurement signals. This may comprise receiving the impedance signal (block 510), receiving the acoustic signal (block 520) and receiving the temperature signal (block 530). Each of these signals is described in more detail hereinbefore in context of the precipitation analyzer 220 provided within one of the precipitation sensors 200, 300 and 400. Herein, the method 500 involves receiving at least the impedance signal and the acoustic signal, whereas receiving the temperature signal is optional.

The received signals are applied to derive precipitation indicators, e.g. the first precipitation indicator $I_1$, the second precipitation indictor $I_2$ and, optionally, the third precipitation indicator $I_3$. Characteristics of these precipitation indicators and exemplifying approaches for their derivation within respective blocks 515, 525, 535 are described hereinbefore in context of the precipitation analyzer 220 provided within one of the precipitation sensors 200, 300 and 400.

In block 540, the derived precipitation indicators (e.g. $I_1$, $I_2$ and optionally $I_3$) are applied to designate the current precipitation type. The designation of the precipitation type within block 540 may be carried out as described hereinbefore in context of the precipitation analyzer 220 provided within one of the precipitation sensors 200, 300 and 400. Blocks 550 and 560 provide optional steps of determination of the precipitation intensity on basis of the precipitation type and the precipitation indicators and determination of the accumulated precipitation, respectively, both operations carried out as described hereinbefore in context of the precipitation analyzer 220 provided within one of the precipitation sensors 200, 300 and 400. Finally, the method 500 comprises providing (e.g. outputting) the determined precipitation characteristics, i.e. the precipitation type, possibly together with the precipitation intensity and/or accumulation, for further processing and/or for presentation to the user(s), as indicated in block 570.

FIG. 7 schematically illustrates an exemplifying apparatus 700 upon which an embodiment of the invention may be implemented. The apparatus 700 as illustrated in FIG. 7 provides a diagram of exemplary components of an apparatus, which is capable of operating as or providing the precipitation analyser 220 according to an embodiment. The apparatus 700 comprises a processor 710 and a memory 720. The processor 710 is configured to read from and write to the memory 720. The memory 720 may, for example, act as the memory for storing the audio/voice signals and the noise/voice characteristics. The apparatus 700 may further comprise a communication interface 730, such as a network card or a network adapter enabling wireless or wireline communication with another apparatus and/or radio transceiver enabling wireless communication with another apparatus over radio frequencies. The apparatus 700 may further comprise a user interface 740 for providing data, commands and/or other input to the processor 710 and/or for receiving data or other output from the processor 710, the user interface 740 comprising for example one or more of a display, a keyboard or keys, a mouse or a respective pointing device, a touchscreen, a touchpad, etc. The communication interface 730 and/or the user interface 740 may be applied to provide indication of the determined precipitation characteristics to other apparatuses/entities and to the user(s). The apparatus 700 may comprise further components not illustrated in the example of FIG. 7.

Although the processor 710 is presented in the example of FIG. 7 as a single component, the processor 710 may be implemented as one or more separate components. Although the memory 720 in the example of FIG. 7 is illustrated as a single component, the memory 720 may be implemented as one or more separate components, some or all of which may be integrated/removable and/or may provide permanent/semi-permanent/dynamic/cached storage.

The memory 720 may store a computer program 750 comprising computer-executable instructions that control the operation of the apparatus 700 when loaded into the processor 710. As an example, the computer program 750 may include one or more sequences of one or more instructions. The computer program 750 may be provided as a computer program code. The processor 710 is able to load and execute the computer program 750 by reading the one or more sequences of one or more instructions included therein from the memory 720. The one or more sequences of one or more instructions may be configured to, when executed by one or more processors, cause an apparatus, for example the apparatus 700, to carry out the operations, procedures and/or functions described hereinbefore in context of the precipitation analyzer 220 of one of the precipitation sensors 200, 300 and 400.

Hence, the apparatus 700 may comprise at least one processor 710 and at least one memory 720 including computer program code for one or more programs, the at least one memory 720 and the computer program code configured to, with the at least one processor 710, cause the apparatus 700 to perform the operations, procedures and/or functions described hereinbefore in context of the precipitation analyzer 220 of one of the precipitation sensors 200, 300 and 400.

The computer program 750 may be provided at the apparatus 700 via any suitable delivery mechanism. As an example, the delivery mechanism may comprise at least one computer readable non-transitory medium having program code stored thereon, the program code which when executed by an apparatus cause the apparatus at least to carry out the operations, procedures and/or functions described hereinbefore in context of the precipitation analyzer 220 of one of the precipitation sensors 200, 300 and 400. The delivery mechanism may be for example a computer readable storage medium, a computer program product, a memory device a record medium such as a CD-ROM, a DVD, a Blue-Ray disc or another article of manufacture that tangibly embodies the computer program 750. As a further example, the delivery mechanism may be a signal configured to reliably transfer the computer program 750.

Reference to a processor should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. An apparatus for characterizing precipitation, the apparatus comprising a precipitation analyzer configured to receive an impedance signal that is indicative of the impedance in a predetermined area on a measurement surface, derive, on basis of the impedance signal, a first precipitation rate that is descriptive of accumulated mass of precipitation particles falling on said predetermined area during a calculation period, receive an acoustic signal that is indicative of acoustic impacts caused by said precipitation particles in vicinity of said measurement surface, derive, on basis of said acoustic signal, a second precipitation rate that is descriptive of accumulated mass of said precipitation particles during the calculation period, and designate, in response to receiving an indication regarding a presence of precipitation, current precipitation type as one of predetermined precipitation types at least in part on basis of a first precipitation indicator value derived as a ratio of the first and second precipitation rates.

2. The apparatus according to claim 1, wherein said acoustic signal is indicative of acoustic impacts caused by said precipitation particles on said measurement surface.

3. The apparatus according to claim 1, wherein each of said precipitation rates is determined as a sum of those precipitation particle masses indicated on basis of the respective one of the impedance and acoustic signals that exceed a predefined threshold mass.

4. The apparatus according to claim 1, wherein said designating comprises determining one or more precipitation type probability indicators on basis of the first precipitation indicator, wherein each precipitation type probability indicator is descriptive of probability of respective precipitation type, and designating the current precipitation type as the precipitation type associated with the largest of the precipitation type probability indicators.

5. The apparatus according to claim 4, wherein said one or more precipitation type probability indicators comprise at least the following:

an indicator descriptive of probability of a liquid precipitation type, an indicator descriptive of probability of a solid precipitation type, an indicator descriptive of probability of a mixed precipitation type.

6. The apparatus according to claim 1, wherein the acoustic signal is indicative of acoustic impacts caused by said precipitation particles falling on said predetermined area, and wherein said designating comprises designating the current precipitation type further on basis of a second precipitation indicator value indicative of the extent of similarity in timing and masses of the precipitation particles indicated on basis of the impedance and acoustic signals.

7. The apparatus according to claim 6, wherein said designating comprises determining one or more first precipitation type probability sub-indicators on basis of the first precipitation indicator, each sub-indicator descriptive of probability of respective precipitation type, determining one or more second precipitation type probability sub-indicators on basis of the second precipitation indicator, each sub-indicator descriptive of probability of respective precipitation type, computing one or more precipitation type probability indicators as the sum of respective first and second precipitation type probability sub-indicators, and designating the current precipitation type as the precipitation type associated with the largest of the precipitation type probability indicators.

8. The apparatus according to claim 1, further configured to receive a temperature signal that is indicative of at least one of a dew point temperature and a wet-bulb temperature of the ambient air around said area, and wherein said designating comprises designating the current precipitation type further on basis of a third precipitation indicator derived on basis of said temperature signal and variation of said temperature signal within a third observation period.

9. The apparatus according to claim 8, wherein said designating comprises determining one or more first precipitation type probability sub-indicators on basis of the first precipitation indicator, each sub-indicator descriptive of probability of respective precipitation type, determining one or more second precipitation type probability sub-indicators on basis of the second precipitation indicator, each sub-indicator descriptive of probability of respective precipitation type, determining one or more third precipitation type probability sub-indicators on basis of the third precipitation indicator, each sub-indicator descriptive of probability of respective precipitation type, computing one or more precipitation type probability indicators as the sum of respective first, second and third precipitation type probability sub-indicators, and designating the current precipitation type as the precipitation type associated with the largest of the precipitation type probability indicators.

* * * * *